(12) United States Patent
Lin et al.

(10) Patent No.: US 11,028,878 B2
(45) Date of Patent: Jun. 8, 2021

(54) BEARING STRUCTURAL MEMBER, SUPPORT, JOINT ASSEMBLY AND TUBE SECTION ASSEMBLY

(71) Applicants: China Communications Construction Company Limited, Beijing (CN); CCCC Highway Consultants Co., Ltd., Beijing (CN); CCCC Wuhan Harbour Engineering Design & Research Co., Ltd., Hubei (CN); Shanghai Zhenhua Heavy Industries Co., Ltd., Shanghai (CN)

(72) Inventors: Ming Lin, Beijing (CN); Wei Lin, Beijing (CN); Xiaodong Liu, Beijing (CN); Kexin Liu, Beijing (CN); Haiqing Yin, Beijing (CN); Liuqing Tu, Beijing (CN); Jibing Gao, Beijing (CN); Yaping Liu, Beijing (CN); Weibin Chen, Beijing (CN); Yiyuan Wu, Beijing (CN); Huawen Wang, Beijing (CN); Yu Liu, Beijing (CN)

(73) Assignees: China Communications Construction Co. Ltd., Beijing (CN); CCCC Highway Consultants Co. Ltd., Beijing (CN); CCCC Wuhan Harbour Engineering Design & Research Co., Ltd., Wuhan (CN); Shanghai Zhenhua Heavy Industries Co., Ltd., Shanghai (CN)

( * ) Notice: Subject to any disclaimer, the term of this patent is extended or adjusted under 35 U.S.C. 154(b) by 567 days.

(21) Appl. No.: 15/870,616

(22) Filed: Jan. 12, 2018

(65) Prior Publication Data
US 2019/0078618 A1    Mar. 14, 2019

(30) Foreign Application Priority Data

Sep. 8, 2017 (CN) .......................... 201710806078.6

(51) Int. Cl.
*F16M 13/00* (2006.01)
*F16C 33/12* (2006.01)
(Continued)

(52) U.S. Cl.
CPC .......... *F16C 33/121* (2013.01); *E04H 9/024* (2013.01); *F16C 29/002* (2013.01); *F16C 33/14* (2013.01);
(Continued)

(58) Field of Classification Search
CPC ...... F16C 33/121; F16C 33/14; F16C 33/208; F16C 33/3831; E01D 19/042; E01D 19/041
(Continued)

(56) References Cited

U.S. PATENT DOCUMENTS 3,806,975 A * 4/1974 Fyfe .......................... E04B 1/36
14/73.5
4,610,486 A * 9/1986 Baigent ................. E01D 19/042
384/7
(Continued)

*Primary Examiner* — Todd M Epps
(74) *Attorney, Agent, or Firm* — Andrew D. Fortney; Central California IP Group, P.C.

(57) ABSTRACT

The present application discloses a bearing structural member, a support, a joint assembly and a tube section assembly, wherein the maximum counter force provided by the bearing structural member under an external load is an own designed threshold value, namely when the external load is greater than the designed threshold value of the bearing structural member, the bearing structural member deforms, and provides a counter force equal to the designed threshold value; the support includes at least one bearing structural member; and the joint assembly and the tube section assembly are both equipped with the support. When the external load is not high and is less than the designed threshold value, the bearing structural member may effectively suppress the deformation just like a rigid structural member; when the
(Continued)

external load exceeds the designed threshold value, the bearing structural member may deform, and provide a stable counter supporting force less than the external load. The bearing structural member may be applied to the support, the joint assembly and the tube section assembly, plays a role in protecting the structures or key structural components, and may be widely applied to the fields of design of bridges, design of building structures, design of tunnels and the like.

40 Claims, 11 Drawing Sheets

(51) Int. Cl.
*E04H 9/02* (2006.01)
*F16C 29/00* (2006.01)
*F16C 35/02* (2006.01)
*F16C 41/02* (2006.01)
*F16C 33/14* (2006.01)
*F16C 33/20* (2006.01)
*F16C 33/38* (2006.01)

(52) U.S. Cl.
CPC ........ *F16C 33/208* (2013.01); *F16C 33/3831* (2013.01); *F16C 35/02* (2013.01); *F16C 41/02* (2013.01); *F16C 2350/00* (2013.01)

(58) Field of Classification Search
USPC .......... 248/560; 384/7, 36; 52/167.1; 14/73.5
See application file for complete search history.

(56) References Cited

U.S. PATENT DOCUMENTS 5,597,240 A * 1/1997 Fyfe ..................... E01D 19/041
14/73.5
2017/0334258 A1 * 11/2017 Yang ..................... B60B 33/00

* cited by examiner

BEARING STRUCTURAL MEMBER, SUPPORT, JOINT ASSEMBLY AND TUBE SECTION ASSEMBLY

This application claims the benefit of Chinese Patent Application No. 2017108060786, filed Sep. 8, 2017, incorporated herein by reference in its entirety.

TECHNICAL FIELD

The present application relates to the technical field of bearing materials and structures, and more particularly relates to a bearing structural member, a support adopting the bearing structural member, a joint assembly and a tube section assembly.

BACKGROUND ART

A deformable solid will deform under the action of an external load. According to the characteristics of the deformation, a mechanical behavior of the solid in a stress process may be generally divided into two obviously different stages: an elastic deformation and a plastic deformation, wherein the elastic deformation is that when an external force is less than a certain limit value (which is generally called an elastic ultimate load), and after the external force causing the deformation is released, the solid may completely recover its original shape; and such recoverable deformation is called the elastic deformation, and the stage that the solid only generates the elastic deformation is called an elastic stage. The plastic deformation is that once the external force exceeds the elastic ultimate load, and then is released, the solid may not recover the original shape, and part of non-disappearing deformation remains; and such remaining permanent deformation is called the plastic deformation, and this stage is called a plastic stage. In addition, in the later stage of the plastic deformation stage of the solid, if a material deforms beyond its plastic limit, a crack may be caused in part of the material; and when the crack extends and finally breaks the solid into a completely separate state, such deformation is called breakage, with reference to a stress-strain curve chart in FIG. 1.

Therefore, when an existing common deformable solid structure is generally used as a bearing structural member, its structural internal force would be less than the ultimate load and greater than the ultimate load due to a change of the external load, and then would cause the elastic deformation and the plastic deformation respectively; an acting force transmitted by this common deformable solid bearing structural member (such as a steel structural member and a copper structural member) to a bottom supporting structure also changes along with the change of the external load; and even if the elastic deformation and the plastic deformation occur, and even the breakage occurs, the acting force transmitted thereby still continuously fluctuates and changes, and may continuously gradually approach to or be equal to the acting force of the external load.

On account of this characteristic, at the present, the deformable solid structure may not be applied to an occasion where only the designed threshold value of a load needs to be transmitted to the bottom supporting structure, such as the field of designs of protective structures for constructions of civil engineering, houses and other projects.

SUMMARY OF THE INVENTION

For the purpose of overcoming shortcomings that a solid structure generally only causes an elastic deformation and a plastic deformation under the action of an external load, and the maximum load transmitted to a bottom supporting structure may not be equal to a designed threshold value due to its continuous change during transmission, the present application provides a bearing structural member and a design method thereof, and further provides a support of the bearing structural member, a joint assembly adopting the support, and a tube section assembly adopting the joint assembly.

In order to achieve the above invention purpose, the present application provides technical schemes as follows:

A design method of a bearing structural member is provided. Under the action of an external load, the maximum counter force provided by the bearing structural member is its own designed threshold value, namely when the external load is greater than the designed threshold value of the bearing structural member, the bearing structural member deforms, and provides a counter force equal to the designed threshold value at the same time.

The bearing structural member of the present application is an existing material structure. The designed threshold value is the maximum counter force provided by the bearing structural member under the external load in a deformation process. The counter force is the one provided by the bearing structural member to an external load acting main body, or a pressure provided by the bearing structural member to a carrier supporting the bearing structural member. A force provided by the external load may be either pressure stress or pulling stress.

It should be noted that theoretically, the maximum counter force is a value accurate to point. However, as a matter of fact, the maximum counter force is actually a value range having a stable field due to microscopic differences in structures of respective bearing structural members and a measurement error, and this value range is also the designed threshold value of the bearing structural member. In addition, when the bearing structural member is pressed by an external load greater than its designed threshold value, the maximum counter force provided hereby is the one provided by the bearing structural member in the deformation process. As the bearing structural member has a certain length in a deformation direction, it deforms under the external load, and its deformation amount also has a deformation limit which is namely the maximum deformation amount; if the bearing structural member is in a stable state, its deformation amount does not tend to be the deformation limit, and at this moment, the counter force provided by the bearing structural member is equal to the designed threshold value; and if the bearing structural member deforms to the limit and may not deform till the end, the maximum counter force provided by the bearing structural member would change suddenly instead and approach to the external load. The counter force value discussed herein is a range from starting of a deformation to a deformation limit region.

According to the design method of the bearing structural member, the bearing structural member may overcome the shortcomings of a rigid structural member which only generates the elastic deformation and the plastic deformation and will be broken under a force greater than an upper limit load, and overcome the shortcoming of a flexible structural member which only generates the elastic deformation, that is, when the external load is not high and less than the designed threshold value, the bearing structural member may provide an equal counter supporting force to effectively suppress the deformation just like the rigid structural member; and when the external load exceeds the designed threshold value, the bearing structural member may quickly deform or generate a cutting deformation (which is different from the conventional elastic deformation or plastic deformation) just like the flexible structural member to provide a stable counter supporting force less than the external load, so that a stable pressure may be provided to a carrier supporting the bearing structural member to protect the supporting carrier from being damaged. The design method may be widely applied to the engineering application fields of design of bridges and design of building structures.

Preferably, when the external load is less than or equal to the designed threshold value of the bearing structural member, the bearing structural member deforms and provides a counter force not greater than the external load at the same time.

According to the above analysis, a load-displacement characteristic curve of the bearing structural member may be divided into multiple stages: in a first stage, the counter force generated by the bearing structural member under the external load is gradually increased along with increase of a deformation amount (a displacement amount) of the bearing structural member, and at the moment, the force of the external load is less than the designed threshold value of the bearing structural member, and the bearing structural member deforms and provides the counter force not greater than the external load; when the external load on the bearing structural member is increased to be equal to the designed threshold value or even exceed the designed threshold value, the bearing structural member is in a second stage; in the second stage, the deformation amount of the bearing structural member is continuously increased, and at the moment, the counter force provided by the deformed bearing structural member is always kept at a constant value equal to the designed threshold value till the deformation amount of the bearing structural member reaches the deformation limit.

Preferably, when the external load is less than or equal to the designed threshold value of the bearing structural member, the bearing structural member generates the elastic deformation or/and the plastic deformation.

When the external load is less than or equal to the designed threshold value of the bearing structural member, the bearing structural member may generate the elastic deformation or/and the plastic deformation, at the moment, the maximum counter force provided by the deformation, similar to that of one rigid structural member, of the bearing structural member belongs to a counter force generated by the elastic deformation or the plastic deformation of an internal structure of the bearing structural member; the amount of the deformation may not fall within a visual resolution length range, but fall within a micro displacement deformation range at the micron level.

Preferably, when the external load is greater than the designed threshold value of the bearing structural member, the bearing structural member generates a deformation faster than the plastic deformation, such as the cutting deformation, and at the moment, it deforms like the flexible structural member, and the maximum counter force provided hereby is less than the external load; and in the deformation process, part of the force of the external load may be released, and the finally provided maximum counter force is a stable threshold value.

Preferably, the external load is a pressure on the bearing structural member, namely a force perpendicular to the surface of the bearing structural member. This force may remain constant, or changes overtime.

The invention further provides a bearing structural member. Under the action of an external load, the maximum counter force provided by the bearing structural member is its own designed threshold value, namely when the external load is greater than the designed threshold value of the bearing structural member, the bearing structural member deforms, and provides a counter force equal to the designed threshold value at the same time.

Preferably, when the external load is less than or equal to the designed threshold value of the bearing structural member, the bearing structural member generates elastic deformation or/and plastic deformation, and provides a counter force not greater than the external load.

When the external load on the bearing structural member is relatively low, namely less than or equal to the designed threshold value of the bearing structural member, the bearing structural member is in a rigid state, and may provide a sufficient counter supporting force by use of the elastic deformation so as to be in a stable state; at the moment, the counter force may not be greater than (namely less than or equal to) the external load; to be more specific, generally, in the process that the bearing structural member generates the slight elastic deformation under the external load (such as a micro displacement deformation range at the micron level), the provided counter supporting force is less than the external load at the corresponding moment; and when the bearing structural member is in the stable state due to the slight elastic deformation, the counter supporting force is equal to the external load;

when the external load is continuously increased, the bearing structural member may be in another deformation state, and provides a higher counter supporting force and deforms (such as a plastic deformation state), and the counter force provided by the bearing structural member and a displacement deformation amount are in a curve change relation;

when the external load is increased to be greater than the designed threshold value of the bearing structural member, namely an upper limit which endangers the structural safety of the bearing structural member, the bearing structural member turns into a large deformation or quick cutting state (but this state is different from a state that a common structural material may be broken); and in the quick deformation process of the bearing structural member, part of the external load may be quickly released, and is equal to or approximately equal to a load force exceeding the designed threshold value of the bearing structural member, so that the bearing structural member may provide the stable counter supporting force less than the external load. As the provided counter force belongs to a force stably remaining at about a certain value, it has a horizontal linear change relation with the displacement deformation amount;

when the external load is released to be equal to or less than the designed threshold value, the bearing structural member stops the deformation in the second stage and turns into the deformation in the first stage, such as the plastic deformation or elastic deformation state.

The bearing structural member may overcome the shortcomings of a rigid structural member which only generates the elastic deformation and the plastic deformation and will be broken under a force greater than an upper limit load, and overcome the shortcoming of a flexible structural member which only generates the elastic deformation, that is, when the external load is not high and less than the designed threshold value, the bearing structural member may provide an equal counter supporting force to effectively suppress the deformation just like the rigid structural member; and when the external load exceeds the designed threshold value, the bearing structural member may quickly generate a large deformation or cutting deformation just like the flexible structural member (the large deformation here means a larger deformation amount within unit time relative to a relatively small deformation of the bearing structural member under the external load less than the designed threshold value, and the cutting deformation is a deformation state caused by slippage of crystals along a crystal lattice possibly caused in the deformation process of the bearing structural member) to provide a stable counter supporting force less than the external load, so that a stable pressure may be provided to a carrier supporting the bearing structural member to protect the supporting carrier from being damaged. The bearing structural member may be widely applied to the engineering application fields of design of bridges, design of building structures and design of tunnels.

Preferably, the bearing structural member is a metal material or metal alloy material structural member.

Preferably, the bearing structural member is a zinc material structural member, a zinc alloy material structural member, an aluminum material structural member, or an aluminum alloy material structural member.

The bearing structural member has proper extensibility and good machinability, and applicable metals include zinc, a zinc alloy or aluminum, an aluminum alloy and the like, and are convenient to machine and manufacture, but a metal with extremely high extensibility, such as existing red copper, and a brittle metal such as bronze do not accord with the characteristics of the bearing structural member.

Preferably, the bearing structural member is a columnar body.

Preferably, the bearing structural member is a rotator structure such as a cylindrical structure. The material is homogeneously isotropic along the axial line serving as a symmetry axis to better accord with the characteristics of the bearing structural member.

Preferably, the bearing structural member includes a reducing section, and the reducing section is a structural part of which the cross section size changes along the axial direction.

The reducing section structural part of the bearing structural member plays a role in bearing the external load, and also plays a role in stabilizing a load-displacement curve, namely in the deformation process of the reducing section, the stable counter force is provided.

Preferably, the reducing section is a structure of which the cross section size is gradually increased along the axial direction, wherein the cross section size of the end portion of the reducing section is greater than that of a position, which is connected with a sizing section, at the reducing section.

Preferably, the side surface of the reducing section is inwards sunken into a horn shape, and this structure may enable the large deformation or cutting deformation of the bearing structural member under the action of the external load greater than the designed threshold value to be relatively symmetric and uniform, so that the provided counter force is also in a relatively stable state.

Preferably, the bearing structural member further includes the sizing section connected to the reducing section, and the sizing section is a structural part of which the cross section size is equal along the axial direction.

The sizing section of the bearing structural member is mainly used to bear the external load, and the reducing section is mainly the structural part playing a main role in deformation.

Preferably, the sizing section and the reducing section are in smooth transition. The bearing structural member is an integrated structural member, so that the material is isotropic, and breakage at an upper limit of a plastic deformation load due to a surface defect or an internal structural defect is avoided.

Preferably, an assembling section for installing the bearing structural member is further disposed at the lower end of the reducing section, and the structural size of the end, which is connected with the reducing section, of the assembling section is smaller than the size of the end portion structure of the reducing section.

The assembling section is used for installing and fixing the bearing structural member, and also enabling the deformation of the bearing structural member to be concentrated at the reducing section between the sizing section and the assembling section.

Preferably, the assembling section is a rotator structure, and the assembling section, the sizing section and the reducing section are integrated structural members.

Preferably, the diameters of the cross sections of the sizing section, the reducing section and the assembling section of the bearing structural member are d3, d3 to d2, and d1 respectively, wherein d2 is greater than d3 which is greater than d1; the diameter of the cross section of the reducing section is d3 to d2, which means that diameter of the cross section of the reducing section (12) is d3 at minimum and d2 at maximum.

Preferably, a structure which connects the reducing section with the assembling section is a shoulder, and the shoulder has the width of (d2−d1)/2 ranging from 3 to 4 mm.

A test shows that the value of the shoulder width of the shoulder structure may enable the provided counter force and the displacement deformation amount to approach to the horizontal linear change relation in the large deformation or cutting deformation of the bearing structural member.

Preferably, the sizing section has a length L3 of 22 to 28 mm, and the diameter d3 of 45 to 50 mm; the reducing section has a length L2 of 18 to 22 mm, and the maximum diameter d2 of 48 to 55 mm; and the assembling section has a length L1 of 13 to 16 mm, and the diameter d1 of 42 to 45 mm.

The present application further provides a support, including at least one bearing structural member mentioned-above.

The support includes the bearing structural member. It should be noted that when the bearing structural member on the support is pressed to deform, other structures inside a portion, which is located on the same layer as the bearing structural member, of the support would not provide rigid supporting, so that the support also deforms during deformation of the bearing structural member.

The support realizes load memory protection by use of stress-strain characteristics of a counter force provided by the deformation of the bearing structural member and a displacement change amount. Namely when an external load is relatively low (less than a load upper limit of the support), the whole support is in a rigid state, and may provide a sufficient counter supporting force by use of the elastic deformations of all the bearing structural members; when the external load is continuously increased and less than a sum of the designed threshold values of all the bearing structural members, the support turns into a plastic state, and may provide a higher counter supporting force, then generate a plastic deformation and release the load; when the external load is increased to an upper limit possibly endangering the structural safety (namely the external load is greater than the sum of the designed threshold values of all the bearing structural members, but less than a load upper limit value where the support is broken), the support turns into a large deformation or quick cutting deformation memory state, namely the support quickly releases part of the load in the quick deformation process, and continuously provide a stable counter supporting force less than the external load; and when the load is released to be less than a lower limit load (namely the minimum external load value where the support generates the plastic deformation), the support then turns into an elastic state.

Therefore, the support overcomes the shortcomings of a rigid support and a flexible support. When the external load is not high, the support effectively suppresses the deformation; when the external load exceeds the limit, the support quickly deforms to protect the structures; and therefore, a stable pressure may be provided to a supporting carrier at the bottom of the support to protect the supporting carrier from being damaged. The support may be widely applied to the engineering application fields of safety design of bridge and tunnel structures and design of building structures.

Preferably, a direction of the counter force provided by each bearing structural member under stress is parallel to a direction of the deformation of the support under the external load.

Preferably, the heights of all the bearing structural members are equal.

Preferably, the structures of all the bearing structural members are the same, namely shapes, sizes and materials are the same.

Therefore, the maximum counter supporting forces provided by the bearing structural members are equal, and different quantities of bearing structural members may be flexibly selected according to an actually required counter supporting force to complete desired requirements.

In addition, supports with the load bearing capacities at different levels may be designed by changing diameter and length parameters of a single bearing structural member, and a support with high load bearing capacity also may be designed by combining multiple bearing structural members; and meanwhile, the support formed by combining the multiple bearing structural members is more stable in bearing capacity, so that the instability of the support only including the single bearing structural member is eliminated.

Preferably, the support also includes a pressure bearing plate. The bottoms of all the bearing structural members are disposed on the surface of the pressure bearing plate, and the pressure bearing plate is harder than the bearing structural members.

The pressure bearing plate is disposed at the bottoms of all the bearing structural members, and the bearing structural members are installed on the pressure bearing plate, so that all the bearing structural members may transmit a force thereon to the pressure bearing plate, and the pressure bearing plate transmits the force to the supporting carrier below to realize stable transmission of the force of the support and avoid an instable state of the support due to non-uniform stress on the supporting carrier below.

Preferably, a limiting structure for transversely limiting each bearing structural member is disposed on the pressure bearing plate to avoid transverse movement of the bearing structural member under the stress and realize stably downwards transmission along the axial line.

Preferably, the limiting structure is an assembling hole matched with the structure of an assembling section on each bearing structural member.

Preferably, the assembling hole includes an upper hole with a relatively small diameter and a lower hole with a relatively large diameter. The upper hole and the lower hole are communicated with each other; and the upper hole is matched with the assembling section of the bearing structural member in diameter size.

The assembling hole adopts the relatively small upper hole and also adopts the lower hole which is located below the small hole and has the relatively large diameter. The upper hole is matched with the assembling section of the bearing structural member to realize limit and fixing functions, and the side wall of the upper hole is matched with the structure of the shoulder which connects the assembling section with the reducing section to realize a supporting function; and the function of the lower hole is that when the bearing structural member generates the large deformation or cutting deformation under the external load greater than the designed threshold value, the deformed structure may enter the lower hole through the upper hole to achieve a containing effect, thus avoiding the extension of the deformed structure towards the radial direction of the reducing section to affect other structures of the support.

Preferably, the upper hole is in interference fit with the assembling section of the bearing structural member.

Further preferably, the diameter of the upper hole is 10 to 20 microns less than that of the assembling section of the bearing structural member, so that the bearing structural member may be closely fitted to the pressure bearing plate; and under the action of the external load, the bearing structural member may not shake, but keep a stable stress state.

Preferably, all the bearing structural members are uniformly disposed on the pressure bearing plate.

Preferably, the support further includes a loading plate. The loading plate is disposed at the top ends of all the bearing structural members; all the bearing structural members are disposed between the loading plate and the pressure bearing plate; and the loading plate is harder than the bearing structural members.

The loading plate is disposed at the top ends of the bearing structural members, and has a purpose of uniformly transmitting the force of the external load to each bearing structural member.

It should be noted that the loading plate and the perforated pressure bearing plate are metal or non-metal materials with the hardness greater than that of the bearing structural members, and may press and cut the bearing structural members to deform them.

Preferably, at least one shear-resistant column for preventing transverse movement of all the bearing structural members and the pressure bearing plate is further disposed between the pressure bearing plate and the loading plate; limiting holes are formed in the pressure bearing plate, and blind holes are formed in the loading plate; the lower ends of the shear-resistant columns are matched with the limiting holes of the pressure bearing plate, and the upper ends of the shear-resistant columns are matched with the blind holes of the loading plate; in an initial state, the shear-resistant columns are in no contact with the bottoms of the blind holes, thus forming clearances; and the shear-resistant columns is harder than the bearing structural members.

The limiting holes formed in the pressure bearing plate and the blind holes formed in the loading plate are opposite, and may contain the shear-resistant columns; the shear-resistant columns are used to prevent a shear force in a horizontal direction on the support from damaging the structures of the support and avoid horizontally transverse movement of the bearing structural members relative to other structures of the support, thereby protecting normal bearing and deformation of the bearing structural members in the support; and of course, in order to facilitate the assembling of each bearing structural member, a plurality of blind holes corresponding to the bearing structural members may be also formed in the loading plate.

Preferably, all the shear-resistant columns are the same in shapes, structures and sizes, and are uniformly disposed among all the bearing structural members to improve the effect of the support of resisting the shear force in the horizontal direction.

Preferably, an antiskid base plate is further disposed at the bottom of the pressure bearing plate. The antiskid base plate at the bottom of the pressure bearing plate is used to increase horizontal slippage of the support to weaken or eliminate an excessive horizontal shear force on the structures inside the support due to a friction force of the supporting carrier on the bottom of the support, and may enable the overall support to slide or rotate to a proper extent under the horizontal shear force to protect a relatively static state of the bearing structural members and other structures in the support. The necessity for use of the antiskid base plate depends on application conditions. Specifically, the antiskid base plate may be made of a material such as asphalt, rubber and stainless steel.

Preferably, a wedge-shaped jointing pad plate capable of adjusting the height of the support is disposed above the loading plate.

The jointing pad plate is used to fill up a residual clearance formed by installation of the support, and may be a steel pad plate or a concrete bag, which is an optional structural member.

Preferably, side baffles are arranged at the peripheries between the loading plate and the pressure bearing plate, are vertically installed between the loading plate and the pressure bearing plate, and are used to beautify the appearance of the support and play a role in waterproofing and dust-proofing.

In addition, in order to facilitate hoisting, installation and movement of the support, assemblies such as an anchorage plate may be further disposed on the surface of the support.

Preferably, the support is in a square, polyhedral column, circular or elliptical shape, and may be further customized according to the shape and size of a placing space.

The present application further provides a joint assembly, including a joint I and a joint II. At least one shear key I and at least one shear key II are disposed at two mutually connected end portions of the joint I and the joint II respectively; all the shear keys I and all the shear keys II are disposed on the end surface of the corresponding joint I or joint II in a staggering manner; and the above-mentioned support is disposed in a clearance between adjacent shear key I and shear key II. The joint assembly includes the joint I and the joint II. The joint I and the joint II may be two independent structural members, such as structures disposed at the end portions of structural members such as a beam body and a tube body. Different from conventional fixed connection or rigid connection, the joint assembly adopts two shear keys. The support is disposed between the shear key I and the shear key II, and ultimate loads of the shear key I and the shear key II are deemed to be equal to the designed threshold value of the support. As the support includes the bearing structural members which may provide the maximum counter force equal to the designed threshold value under an external load, the joint assembly may provide a transmission effect of a certain designed load value, namely the support in the joint assembly may provide a certain supporting force to the beam body or tube body structural member connected with the joint I or/and the joint II; when the external load is less than or equal to the designed threshold value of the support, the support provides a counter supporting force just like a rigid structural member to keep the joint assembly in a stable state; when the external load is greater than the designed threshold value of the support, the support quickly deforms or generates a cutting deformation to keep a pressure transmitted by the support to the shear keys below equal to the designed threshold value till the joint I and the joint II reach a new equilibrium; when the support deforms to the maximum (namely the bearing structural members completely deforms and are flattened), but the external load still exceeds the designed threshold value of the support, the external load on the support is transmitted to the two shear keys; however, the external load also exceeds the ultimate loads of the shear keys, so that the shear keys are broken, including cases that one joint is kept stable, and the joint I is separated from the joint II to avoid simultaneous breakage of the two joints; compared with the case that the existing two fixedly and rigidly connected joints may deform or be broken at the same time under the external load, the joint assembly overcomes the shortcomings of rigid connection or flexible connection of the existing joints by disposal of the support having the bearing structural members; when an external load is not high, the joint assembly may effectively suppress the deformation; when the external load exceeds the limit, the support in the joint assembly quickly deforms to protect the structures; and therefore, a stable counter supporting force may be provided to the two joints to protect the two joints from being damaged at the same time. The joint assembly may be widely applied to the engineering application fields of safety design of bridge and tunnel structures and design of building structures.

Preferably, when two end portions of the joint I and the joint II are matched with each other, all the shear keys I and the shear keys II are matched in a staggering manner along a vertical direction.

Preferably, two parallel shear keys I along a horizontal direction are disposed at one end portion of the joint I along the vertical direction; one shear key II is disposed at the end, which is connected with the joint I, of the joint II; the shear key II may be in clearance fit with the two shear keys I; and the support is disposed in the clearance between the adjacent shear key I and shear key II.

Preferably, the joint I and the joint II are both reinforced concrete structural tube fittings; the shear keys I are steel shear keys fixed at the end portion of the joint I through embedded parts; and the shear key II is a steel shear key fixed at the end portion of the joint II through an embedded part.

As the two steel shear keys are both embedded into the two joints and have ultimate loads, the support having the designed threshold value equal to the ultimate loads of the steel shear keys is used to play a role in protecting the two joints.

The present application further provides a tube section assembly, including a plurality of tube sections. Two adjacent tube sections are connected through the above-mentioned joint assembly.

The tube sections included in the tube section assembly may be applied to connection of tube bodies on lands and mountains, and even may be applied to the field of seabed immersed tubes, for example, during application to the seabed immersed tubes, when the tube section II may possibly settle under an external acting force such as sunken ship collision and seaquake, one end of the tube section II firstly transmits the force into the joint assembly connected with the tube section I, then an external load on the support of the joint assembly is suddenly increased, and the bearing structural members in the support then deform to provide a counter supporting force to enable the two tube sections to reach a new mechanical equilibrium, including the following cases:

if the external load is less than or equal to the designed threshold value of the support, the counter supporting force provided by the joint assembly is released to the tube section I and the tube section II for sharing, so that the end portion of the tube section II connected with the joint assembly may not move relative to the tube section I, and the positions of the two tube sections are kept unchanged; and even if there is a movement, it is a displacement change caused by common settlement of the tube section I and the tube section II till counter acting forces provided by the bottoms of the two tube sections are equal to pressures of the tube section I and the tube section II.

If the external load is greater than the designed threshold value of the support, the support of the joint assembly may quickly deform and generate a cutting deformation. In the deformation process of the support, the end portion of the tube section II may move relative to the tube section I, leading to relative displacement between a structural member II and a structural member I, but the acting force, which is transmitted to the tube section I, of the external load on the tube section II is always equal to the designed threshold value counter force provided by the deformation of the support, so that it falls within a safe range, and may not affect the stability of the tube section I and the structures of the joint assembly; at the moment, the displacement of the tube section II causes settlement; on account of the settlement of the tube section II, a supporting foundation at the bottom of the tube section II is pressed to provide a counter acting force to the tube section II, namely the counter supporting force of the foundation to the tube section II is gradually increased; when the increment of the counter supporting force of the foundation to the tube section II offsets part of the load force, which is caused by the settlement of the tube section II, on the support of the joint assembly, and when the load force on the joint assembly between the tube section I and the tube section II is less than or equal to the designed threshold value of the support, the support stops deforming and keeps a new mechanical equilibrium state, or the support would deform all the time, the tube section II would settle all the time, and the foundation would also be compressed all the time; the counter supporting force provided by the foundation is continuously increased till supporting forces of the tube section I, the joint assembly and the foundation to the tube section II reach the new mechanical equilibrium state, so that all the structures can be kept in a stable equilibrium state, and at the moment, the mutual displacement of the tube section I and the tube section II may be very small relative to the size of each tube section (if the size of the tube section is more than 10 meters, the displacement amount is several centimeters); and the new mechanical equilibrium is achieved by an extremely small deformation amount of the support; under an extreme condition, if the external load is much greater than the designed threshold value of the support, after the load acting force provided to the joint assembly is increased so as to enable the support to quickly deform and generate the cutting deformation to the maximum, and when the increment of the counter supporting force, which is caused by the settlement of the tube section II, of the foundation is not enough to offset the part of the load force, which is greater than the threshold value, on the support of the joint assembly, the load force on the shear keys I on the tube section I of the joint assembly also exceeds the ultimate load, and then the shear keys I are broken, which leads to separation of the tube section I and the tube section II and continuous settlement of the tube section II; and the external load force is only borne by the tube section II instead of being jointly borne by the tube section I and the tube section II, which leads to continuous settlement of the tube section II, so that the tube section II and the foundation are compressed mutually to reach the new mechanical equilibrium, and even the tube section II is damaged, but relative to the situation that the tube section I and the tube section II may be possibly damaged at the same time due to the rigid connection, this extreme condition may prevent the tube section I and even more other tube sections from being damaged, thereby maintaining the safety of most tube section structures. The tube section assembly may be widely applied to the engineering application fields of safety design of land bridge and tunnel structures, design of building structures and connection of seabed pipelines, thereby increasing the design safety coefficient of tube sections, reducing the potential risk, guaranteeing the safety and the service life of the tube section and facilitating the maintenance of the tube section.

Compared with the prior art, the present application has the beneficial effects as follows:

1. the bearing structural member of the present application may overcome the shortcomings of the rigid structural member which only generates the elastic deformation and the plastic deformation and will be broken under a force greater than an upper limit load, and overcome the shortcoming of the flexible structural member which only generates the elastic deformation, that is, when the external load is not high and less than the designed threshold value, the bearing structural member may provide the equal counter supporting force to effectively suppress the deformation just like the rigid structural member; when the external load exceeds the designed threshold value, the bearing structural member may quickly generate the large deformation or cutting deformation just like the flexible structural member to provide a stable counter supporting force less than the external load, so that the stable pressure may be provided to the carrier supporting the bearing structural member to protect the supporting carrier from being damaged; and the bearing structural member may be widely applied to the engineering application fields of design of bridges, and design of building structures;

2. the bearing structural member of the present application is the zinc material structural member, the zinc alloy material structural member, the aluminum material structural member, or the aluminum alloy material structural member, which is convenient to machine and manufacture and high in mechanical property;

3. the bearing structural member of the present application includes the sizing section, the reducing section and the assembling section; the sizing section is mainly used to bear the external load; the reducing section is mainly a structural portion playing a role in generating main deformation; and the assembling section is used to install and fix the bearing structural member and enables the deformation of the structural bearing member to be concentrated on the reducing section between the sizing section and the assembling section;

4. the support of the present application includes the bearing structural member; when the bearing structural member on the support is pressed to deform, other structures inside a portion, which is located on the same layer with the bearing structural member, of the support would not provide the rigid supporting, so that the support also deforms during deformation of the bearing structural member; the support realizes the load memory protection by use of the stress-strain characteristics of the counter force provided by the deformation of the bearing structural member and a displacement change amount; the support overcomes the shortcomings of a rigid support and a flexible support; when the external load is not high, the support effectively suppresses the deformation; when the external load exceeds the limit, the support quickly deforms to protect the structures; therefore, a stable pressure may be provided to the supporting carrier at the bottom of the support to protect the supporting carrier from being damaged; and the support may be widely applied to the engineering application fields of safety design of bridge and tunnel structures and design of building structures;

5. according to the support of the present application, the pressure bearing plate is disposed at the bottoms of all the bearing structural members, and the bearing structural members are installed on the pressure bearing plate, so that all the bearing structural members may transmit a force thereon to the pressure bearing plate, and the pressure bearing plate transmits the force to the supporting carrier below to realize stable transmission of the force of the support and avoid an instable state of the support due to non-uniform stress on the supporting carrier below; the loading plate is further disposed at the top ends of the bearing structural members and is used to uniformly transmit the force of the external load to each bearing structural member;

6. according to the support of the present application, the assembling hole in the pressure bearing plate adopts the relatively small upper hole and also adopts the lower hole which is located below the small hole and has the relatively large diameter; the upper hole is matched with the assembling section of the bearing structural member to realize limit and fixing functions, and the side wall of the upper hole is matched with the structure of the shoulder which connects the assembling section with the reducing section to realize a supporting function; the function of the lower hole is that when the bearing structural member generates the large deformation or cutting deformation under the external load greater than the designed threshold value, the deformed structure may enter the lower hole through the upper hole to achieve a containing effect, thus avoiding the extension of the deformed structure towards the radial direction of the reducing section to affect other structures of the support;

7. according to the support of the present application, the limiting holes formed in the pressure bearing plate and the blind holes formed in the loading plate are opposite, and may contain the shear-resistant columns; the shear-resistant columns are used to prevent the shear force in the horizontal direction on the support from damaging the structures of the support and avoid the horizontally transverse movement of the bearing structural members relative to other structures of the support, thereby protecting normal bearing and deformation of the bearing structural members in the support;

8. the joint assembly of the present application includes the joint I and the joint II; the joint I and the joint II respectively adopt the shear key I and the shear key II, and the support disposed between the two shear keys; the joint assembly may provide the transmission effect of the certain designed load value, namely the support in the joint assembly may provide the certain supporting force to the beam body or tube body structural member connected with the joint I or/and the joint II; compared with the case that the existing two fixedly and rigidly connected joints may deform or be broken at the same time under the external load, the joint assembly overcomes the shortcomings of rigid connection or flexible connection of the existing joints by disposal of the support having the bearing structural members; when the external load is not high, the joint assembly may effectively suppress the deformation; when the external load exceeds the limit, the support in the joint assembly quickly deforms to protect the structures; therefore, the stable counter supporting force may be provided to the two joints to protect the two joints from being damaged at the same time; the joint assembly may be widely applied to the engineering application fields of safety design of bridge and tunnel structures and design of building structures;

9. the tube section assembly of the present application includes the plurality of tube sections, and the joint assembly connected between two adjacent tube sections; when the tube section II may possibly settle under the external acting force, one end of the tube section II firstly transmits the force into the joint assembly connected with the tube section I, then the external load on the support of the joint assembly is suddenly increased, and the bearing structural members in the support then deform to provide the counter supporting force to enable the two tube sections to reach the new mechanical equilibrium; and the tube section assembly may be widely applied to the engineering application fields of safety design of land bridge and tunnel structures, design of building structures and connection of seabed pipelines, thereby increasing the design safety coefficient of tube sections, reducing the potential risk, guaranteeing the safety and the service life of the tube section and facilitating the maintenance of the tube section.

BRIEF DESCRIPTION OF THE DRAWINGS

FIG. 6-1 is a red copper load-displacement curve chart obtained by the test in Embodiment 3 of the present application;

FIG. 6-2 is a tin bronze load-time curve chart obtained by the test in Embodiment 3 of the present application;

FIG. 6-3 is a brass load-time curve chart obtained by the test in Embodiment 3 of the present application;

FIG. 6-4 is a zinc load-displacement curve chart obtained by the test in Embodiment 3 of the present application;

FIG. 7-1 is a deformation graph of red copper tested in Embodiment 3 of the present application;

FIG. 7-2 is a deformation graph of tin bronze tested in Embodiment 3 of the present application;

FIG. 7-3 is a deformation graph of brass tested in Embodiment 3 of the present application;

FIG. 7-4 is a deformation graph of a zinc rod tested in Embodiment 3 of the present application;

REFERENCE NUMBERS IN THE DRAWINGS

Figure 1:
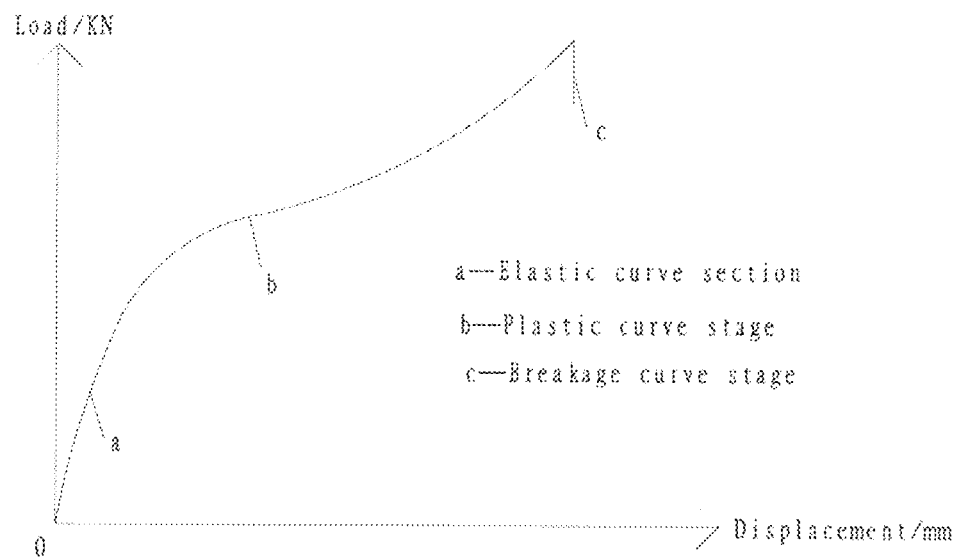
FIG. 1 is a curve chart of a load counter force provided by an existing deformable solid under the action of an external load, and a displacement deformation.

1—bearing structural member, 11—sizing section, 12—reducing section, 13—assembling section, 2—loading plate, 21—blind hole, 3—pressure bearing plate, 31—limiting hole, 32—assembling hole, 321—upper hole, 322—lower hole, 4—shear-resistant column, 5—base plate, 6—side baffle, 7—pad plate, 8—joint I, 81—shear key I, 9—joint II, 91—shear key II, 100—support, 200—tube section I, and 300—tube section II.

DETAILED DESCRIPTION OF THE INVENTION

A further detailed description will be made to the present application in combination with test cases and specific implementation modes as follows, but it should not be understood that the scope of the above subject of the present application is only limited by the following embodiments, and all technologies realized on the basis of the contents of the present application shall fall within the scope of the present application.

Embodiment 1

This embodiment provides a design method of a bearing structural member 1. Under the action of an external load, the maximum counter force provided by the bearing structural member 1 is its own designed threshold value, namely when the external load is greater than the designed threshold value of the bearing structural member 1, the bearing structural member 1 deforms, and provides a counter force equal to the designed threshold value at the same time. A relation between the counter force load and a displacement change of the deformation of the bearing structural member 1 is as shown in the shape of stage c of the curve in FIG. 2.

The bearing structural member 1 of the present application is an existing material structure. The designed threshold value is the maximum counter force provided by the bearing structural member 1 under the external load in a deformation process. The counter force is the one provided by the bearing structural member 1 to an external load acting main body, or a pressure provided by the bearing structural member 1 to a carrier supporting the bearing structural member 1.

It should be noted that theoretically, the maximum counter force is a value accurate to point. However, as a matter of fact, the maximum counter force is actually a value range having a stable field due to microscopic differences in structures of respective bearing structural members 1 and a measurement error, and this value range is also the designed threshold value of the bearing structural member 1. In addition, when the bearing structural member 1 is pressed by an external load greater than its designed threshold value, the maximum counter force provided hereby is the one provided by the bearing structural member 1 in the deformation process instead of one provided in a deformation stable state. As the bearing structural member 1 has a certain length, it deforms under the external load, and may not deform till the end, the maximum counter force provided by the bearing structural member 1 would change suddenly and approach to the external load.

According to the design method of the bearing structural member 1, a theory change of a typical stress-strain curve of the counter force provided by the bearing structural member 1 under the external load and a displacement deformation amount of the bearing structural member 1 may be divided into multiple stages:

in a first stage, the counter force generated by the bearing structural member 1 under the external load is gradually increased along with increase of the deformation amount (the displacement amount) of the bearing structural member 1, and at the moment, the force of the external load is less than the designed threshold value of the bearing structural member 1, and the bearing structural member 1 deforms and provides the counter force not greater than the external load; when the external load on the bearing structural member 1 is increased to be equal to the designed threshold value or even exceed the designed threshold value, the bearing structural member is in a second stage, wherein the deformation of the bearing structural member 1 in the first stage is not necessarily a deformation curve of a conventional elastic deformation or/and plastic deformation, but a load-displacement deformation curve similar to the conventional elastic deformation or/and plastic deformation;

in the second stage, the deformation amount of the bearing structural member 1 is continuously increased, and at the moment, the counter force provided by the deformed bearing structural member 1 is always kept at a constant value equal to the designed threshold value till the deformation amount of the bearing structural member 1 reaches a deformation limit.

Figure 2:
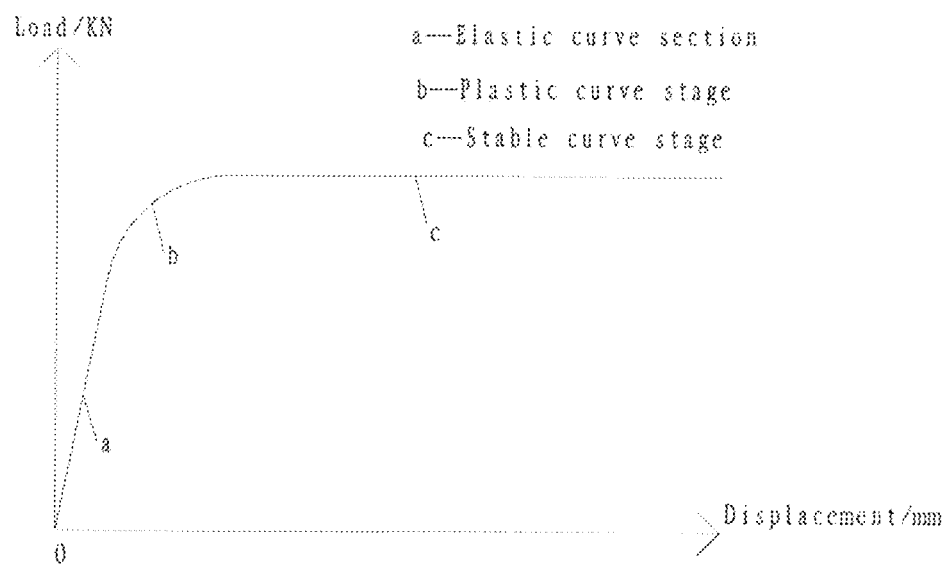
FIG. 2 is a curve chart of a load counter force provided by a bearing structural member of the present application under the action of an external load, and a displacement deformation.

Particularly, when the external load is less than or equal to the designed threshold value of the bearing structural member 1, the deformation of the bearing structural member 1 may be the elastic deformation or/and the plastic deformation, at the moment, the maximum counter force provided by the deformation, similar to that of one rigid structural member, of the bearing structural member belongs to a counter force generated by the elastic deformation or the plastic deformation of an internal structure of the bearing structural member 1; the amount of the deformation does not fall within a visual resolution length range, but falls within a micro displacement deformation range at the micron level; the theory change of the typical stress-strain curve of the counter force provided by the bearing structural member 1 under the external load and the displacement deformation amount of the bearing structural member 1 is as shown in FIG. 2, and includes three sections in sequence: an elastic curve stage a, a plastic curve stage b and a stable curve stage c, specifically including cases as follows:

when the external load is not high and less than the designed threshold value, the bearing structural member 1 generates the elastic deformation or/and the plastic deformation; at the moment, the bearing structural member 1 provides the maximum counter force under the deformation similar to that of one rigid structural member, and may provide an equal counter supporting force just like the rigid structural member to effectively suppress the deformation, namely the elastic curve stage a or the plastic curve stage b as shown in the figure, and theoretically, the elastic curve stage a is a linear straight relation; when the external load exceeds the designed threshold value, the bearing structural member 1 may quickly generate a large deformation or cutting deformation just like a flexible structural member, and the provided maximum counter force is less than the external load to provide a stable counter supporting force less than the external load; and in the deformation process, part of the force of the external load may be released, and the finally provided maximum counter force is a stable threshold value, so that a stable pressure may be provided to the carrier supporting the bearing structural member 1 to protect the supporting carrier from being damaged, as shown in the stable curve stage c in FIG. 2.

The bearing structural member 1 may overcome the shortcomings of the rigid structural member which only generates the elastic deformation and the plastic deformation and will be broken under a force greater than an upper limit load, and overcome the shortcoming of the flexible structural member which only generates the elastic deformation, and may be widely applied to the engineering application fields of design of bridges and design of building structures.

It should be noted that the external load is deemed as a pressure on the bearing structural member 1, namely a force perpendicular to the surface of the bearing structural member 1. This force may be kept constant, or changes over time. In addition, when the external load is less than or equal to the designed threshold value of the bearing structural member 1, the deformation of the bearing structural member 1 may not be the conventional elastic deformation or/and plastic deformation, its curve is then different from the two sections of curves a and b in FIG. 2; however, when the external load is greater than the designed threshold value of the bearing structural member 1, a relation between the counter force load provided by the bearing structural member 1 and the displacement change of the deformation of the bearing structural member 1 is as shown in the shape of stage c of the curve in FIG. 2.

Embodiment 2

Figure 3:
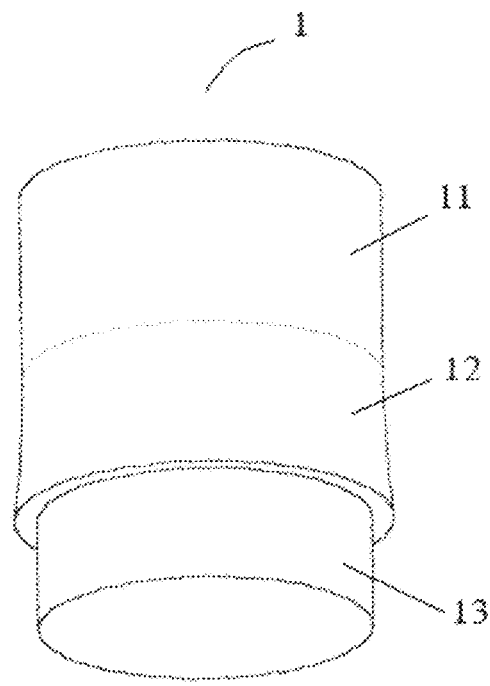
FIG. 3 is a schematic diagram of a structure of a bearing structural member in Embodiment 2 of the present application.

As shown in FIG. 2 and FIG. 3, a bearing structural member 1 is provided. Under the action of an external load, the maximum counter force provided by the bearing structural member 1 is its own designed threshold value, namely when the external load is less than or equal to the designed threshold value of the bearing structural member 1, the bearing structural member 1 generates an elastic deformation or/and a plastic deformation, and provides a counter force not greater than the external load; and when the external load is greater than the designed threshold value of the bearing structural member 1, the bearing structural member 1 deforms, and provides a counter force equal to the designed threshold value.

The bearing structural member 1 of the present application is an existing material structure. The designed threshold value is the maximum counter force provided by the bearing structural member 1 under the external load in a stable state or during deformation. The counter force is the one provided by the bearing structural member 1 to an external load acting main body, or a pressure provided by the bearing structural member 1 to a carrier supporting the bearing structural member 1. Under the condition that the external load changes, the bearing structural member 1 deforms by itself; with continuous increase of the external load, a change of a typical stress-strain curve of the counter force provided by the bearing structural member 1 and the displacement deformation amount of the bearing structural member 1 is as shown in FIG. 2, and includes three sections in sequence: an elastic curve stage a, a plastic curve stage b and a stable curve stage c, specifically including cases as follows:

(1) when the external load on the bearing structural member 1 is relatively low, namely less than or equal to the designed threshold value of the bearing structural member 1, the bearing structural member is in a rigid state, and may provide a sufficient counter supporting force by use of the elastic deformation so as to be in a stable state; at the moment, the counter force is equal to the external load; the counter force provided by the bearing structural member 1 and the displacement deformation amount are theoretically in a linear relation, namely as shown in the elastic curve stage a of FIG. 2, but actually, the elastic stage of the bearing structural member 1 is not necessarily displayed as the linear relation; on the basis of the structure and a measurement error, what is displayed is still a curve relation, but is approximately the linear relation; in addition, the case that the counter force provided by the bearing structural member 1 may not be greater than (namely less than or equal to) the external load means that in the deformation process of the bearing structural member 1, the provided counter force may be slightly less than the external load, but when the bearing structural member 1 tends to be in a deformation stable state (such as a uniform deformation stage), the counter force is equal to the external load;

(2) when the external load is continuously increased, the bearing structural member 1 may be in a plastic deformation state, provide a higher counter supporting force and generate the plastic deformation at the same time; the counter force provided by the bearing structural member 1 and the displacement deformation amount are in a curve change relation, namely the plastic curve stage;

(3) when the external load is increased to a value greater than the designed threshold value of the bearing structural member 1, namely an upper limit endangering the structural safety of the bearing structural member 1, the bearing structural member 1 turns into a large deformation or quick cutting state (but this state is different from a state that a common structural material would be broken); in the quick deformation process of the bearing structural member 1, part of the external load may be quickly released, and is equal to or approximately equal to a load force exceeding the designed threshold value of the bearing structural member 1, so that the bearing structural member 1 may provide a stable counter supporting force less than the external load; as the provided counter force is a force stably kept at about a certain value, the counter force provided by the bearing structural member 1 and the displacement deformation amount are in a horizontally linear change relation, namely the stable curve stage;

when the external load is released to be equal to or less than the designed threshold value, the bearing structural member 1 stops the large deformation or quick cutting state, and turns into the plastic deformation or elastic deformation state again.

The bearing structural member 1 may be a metal material or metal alloy material structural member, and further it may be a zinc material structural member, a zinc alloy material structural member, an aluminum material structural member, or an aluminum alloy material structural member. The bearing structural member has proper extensibility and good machinability, and applicable metals include zinc, a zinc alloy or aluminum, an aluminum alloy and the like, and are convenient to machine and manufacture, but a metal with extremely high extensibility, such as existing red copper, and a brittle metal such as bronze do not accord with the characteristics of the bearing structural member 1.

In order to facilitate machining and testing, the bearing structural member 1 is a rotator structure, such as a cylindrical structure, which is homogeneously isotropic along the axial line serving as a symmetry axis to better accord with the characteristics of the bearing structural member 1.

As shown in FIG. 3, the bearing structural member 1 includes a sizing section 11 and a reducing section 12; the sizing section 11 is a structural part of which the cross section size is the same along the axial direction; the reducing section 12 is a structural part of which the cross section size changes along the axial direction. The sizing section 11 of the bearing structural member 1 is mainly used to bear the external load, and the reducing section is mainly the structural part playing a main role in generating deformation. The sizing section 11 and the reducing section 12 are in smooth transition in order to accord with the isotropy of the material and avoid breakage at an upper limit of a plastic deformation load due to a surface defect or an internal structure defect. The above-mentioned reducing section 12 is a structure of which the cross section size is gradually increased along the axial direction, wherein the cross section size of the end portion of the reducing section 12 is greater than that of a position, which is connected with the sizing section 11, on the reducing section 12. The side surface of the reducing section 12 is inwards sunken into a horn-shaped structure, namely the side surface curve of the longitudinal profile of the reducing section 12 is of an arc shape, and has a certain curvature. This structure may enable the large deformation or cutting deformation of the bearing structural member 1 under the action of the external load greater than the designed threshold value to be relatively symmetric and uniform, so that the provided counter force is also in a relatively stable state.

In order to facilitate installation of the bearing structural member 1, an assembling section 13 is further disposed at the lower end of the reducing section 12, and the structural size of the end, which is connected with the reducing section 12, of the assembling section 13 is less than the size of the end portion structure of the reducing section 12. The assembling section 13 is used for installing and fixing the bearing structural member 1, and also enabling the deformation of the bearing structural member 1 to be concentrated at the reducing section 12 between the sizing section 11 and the assembling section 13. Like the sizing section 11 and the reducing section 12, the assembling section 13 is also a rotator structure, such as the cylindrical structure; and the bearing structural member 1 formed by the sizing section 11, the reducing section 12 and the assembling section 13 is an integrated structural member.

Figure 4:
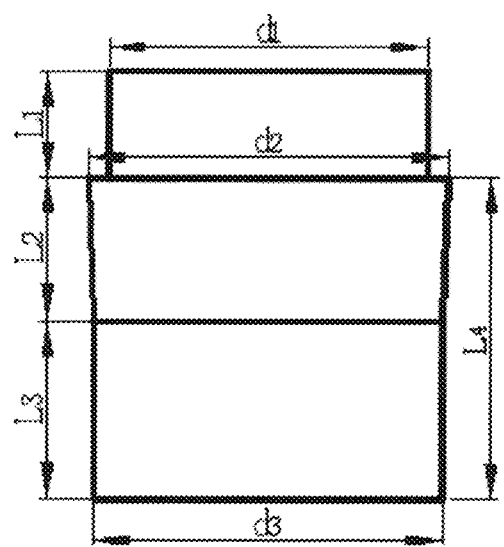
FIG. 4 is a front view of the bearing structural member adopted for a test in Embodiment 2 and Embodiment 3 of the present application.

As shown in FIG. 4, in order to meet an actual requirement, the diameters of the cross sections of the sizing section 11, the reducing section 12 and the assembling section 13 of the bearing structural member 1 are respectively set to be d3, d3 to d2, and d1, and it requires that d2 is greater than d3 which is greater than d1. Further, it is defined that a structure which connects the reducing section 12 with the assembling section 13 is a shoulder, and the shoulder has a shoulder width of (d2−d1)/2.

The bearing structural member 1 may overcome the shortcomings of a rigid structural member which only generates the elastic deformation and the plastic deformation and will be broken under a force greater than an upper limit load, and overcome the shortcoming of a flexible structural member which only generates the elastic deformation, that is, when the external load is not high and less than the designed threshold value, the bearing structural member 1 may provide an equal counter supporting force to effectively suppress the deformation just like the rigid structural member; and when the external load exceeds the designed threshold value, the bearing structural member 1 may quickly generate a large deformation or cutting deformation just like the flexible structural member to provide a stable counter supporting force less than the external load, so that a stable pressure may be provided to a carrier supporting the bearing structural member 1 to protect the supporting carrier from being damaged. The bearing structural member may be widely applied to the engineering application fields of design of bridges, and design of building structures.

Embodiment 3

This embodiment relates to selection and test of a metal material, which meets a performance requirement, of a bearing structural member 1.

1. Initial selection of the material:
the bearing structural member 1 selected (which is called a metal pressure bearing column in this embodiment) shall accord with two basic conditions:
1) its hardness is less than that of steel, and it may be sheared by a porous steel plate;
2) it has sufficient corrosion resistance in a use environment; in comprehensive consideration of load and deformation requirements for shear key base layers, and a working environment where the shear key base layers work, initially selected test materials for a shear key metal pressure bearing column include red copper, tin bronze, brass and zinc. Main mechanical characteristics of all the metal materials for test are described in the table below:

TABLE 1

Main Mechanical Characteristics of All Metal Materials for Test

| S/N | Name | Trademark | Vickers Hardness | Tensile Strength (MPa) |
|---|---|---|---|---|
| 0 | Steel base plate | 45# | ≥300 | ≥600 |
| 1 | Red copper rod | T2 | 100 | 218 |
| 2 | Tin bronze rod | QSn7-0.2 | 80 | ≥355 |
| 3 | Brass rod | H59 | 137 | ≥295 |
| 4 | Pure zinc rod | Zn-05 | 85 | ≥175 |

The above-mentioned steel base plate adopts steel 45 # which is high-quality carbon structural steel, has good mechanical performance, is widely used to machine manufacturing, and is generally applied to a heavy load part with an anti-wear surface and an anti-impact core. The steel 45 # is suitable for being used as a joint base plate component after being subjected to certain surface corrosion resisting treatment.

The red copper is a copper elementary substance. It is a tough and soft purple red and glossy metal with good ductility, and is generally called the red copper as it is rosy and has a purple oxide film formed on the surface. The red copper has good corrosion resistance in the atmosphere, seawater, some non-oxidizing acids (hydrochloric acid, dilute sulfuric acid), alkali, a salt solution and various organic acids (acetic acid and citric acid).

The tin bronze is bronze taking tin as a main alloy element. It is resistant to corrosion and wear, has relatively good mechanical performance and processing property and excellent corrosion resistance in the atmosphere, seawater, fresh water and steam, and is widely used to a steam boiler and a sea boat part.

The brass is an "alloy" consisting of copper and zinc. It is relatively good in corrosion resistance and high in intensity, hardness and chemical corrosion resistance.

The pure zinc is generally produced by pressing a high-quality distilled zinc ingot. This product has a bright color and a compact tissue, does not contain included slag and cavities, and is good in conductivity, corrosion-resistant, uniformly dissolved and long in service life. Zinc has good atmospheric corrosion resistance, and may easily generate a layer of protection film on the surface at normal temperature, so that it is mainly used in the galvanization industry.

In order to facilitate the design, the red copper, the tin bronze, the brass and the pure zinc are all processed into rodlike structures, respectively corresponding to the materials from 1 to 4 in Table 1.

2. Test Design
2.1 Test Method

A microcomputer controlled electro-hydraulic servo pressure tester is used to apply a load to a simulated joint unit, and load-time curve charts and load-displacement curve charts of materials are observed so as to find out a metal material suitable for a joint pressure bearing column.

Figure 5:
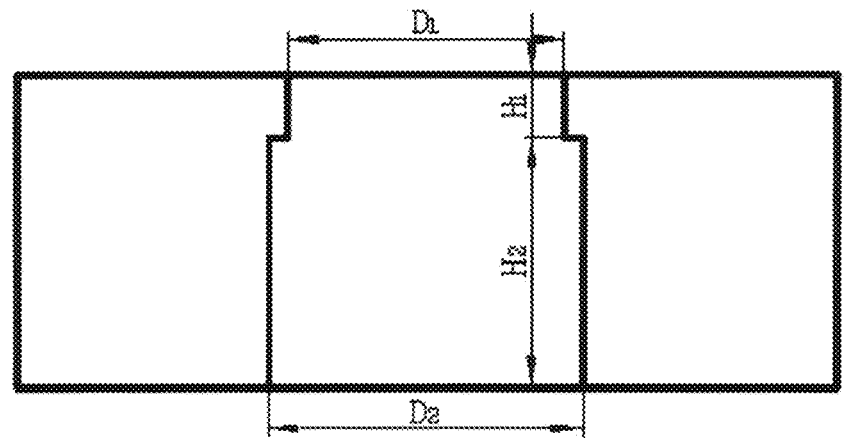
FIG. 5 is a front view of a base plate adopted for a test in Embodiment 3 of the present application.

2.2 Test Equipment and Materials
Test Equipment:
1) microcomputer controlled electro-hydraulic servo pressure tester WAW-2000;
2) microcomputer controlled electro-hydraulic servo pressure tester WAW-1000;
Test Materials:
1) a 45 # steel base plate, the size of which is as shown in FIG. 5, wherein N represents the number of holes, D1 represents the aperture of an upper hole, D2 represents the aperture of a lower hole, H1 represents the depth of the upper hole, and H2 represents the depth of the lower hole.
2) a metal pressure bearing column test piece, the size of which is as shown in FIG. 4, wherein d1 represents the diameter of an assembling section 13, d2 represents the diameter of a bottom opening of a reducing section 12, d3 represents the diameter of a sizing section 11, L1 represents the length of the assembling section 13, L2 represents the length of the reducing section 12, L3 represents the length of the sizing section 11, L4 represents the length of a working section, and the shoulder width a is equal to (d2−d1)/2;

2.3 Test Steps

The test materials are numbered, and then are applied with loads to check an expected material. In the test process, first of all, the metal pressure bearing column and a diameter section are pressed together into the upper hole 321 of the base plate through mechanical pressure till the large-diameter section of the metal pressure bearing column is just in contact with the surface of the base plate, then the microcomputer controlled electro-hydraulic servo universal tester is used to apply the load, and the mechanical property of the metal pressure bearing column is observed.

2.4 Test Result and Analysis

Figures 1, 6:
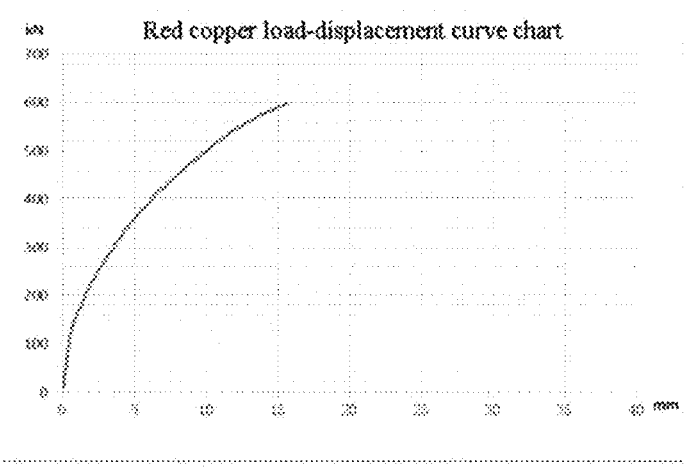
Figures 2, 6:
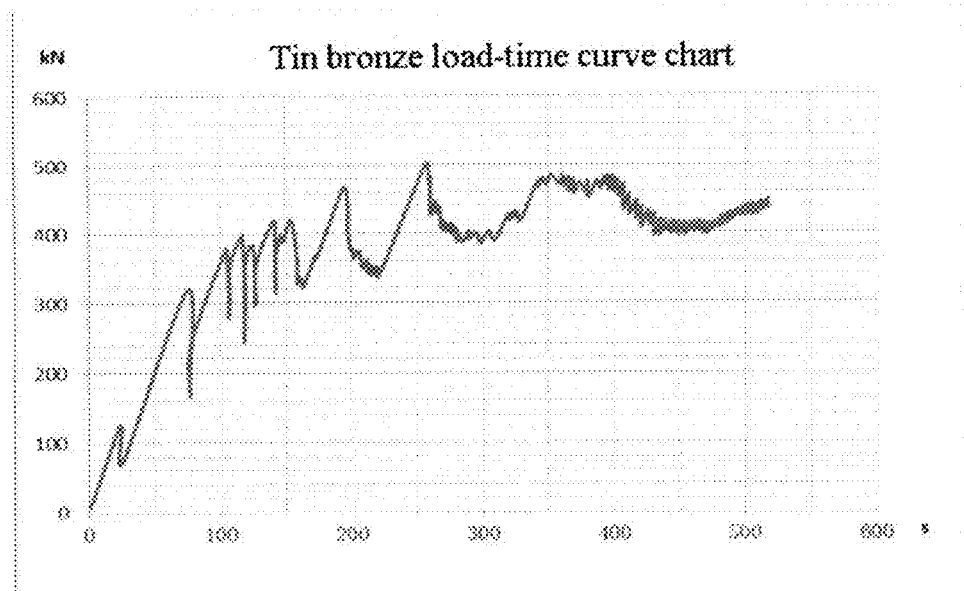
Figures 3, 6:
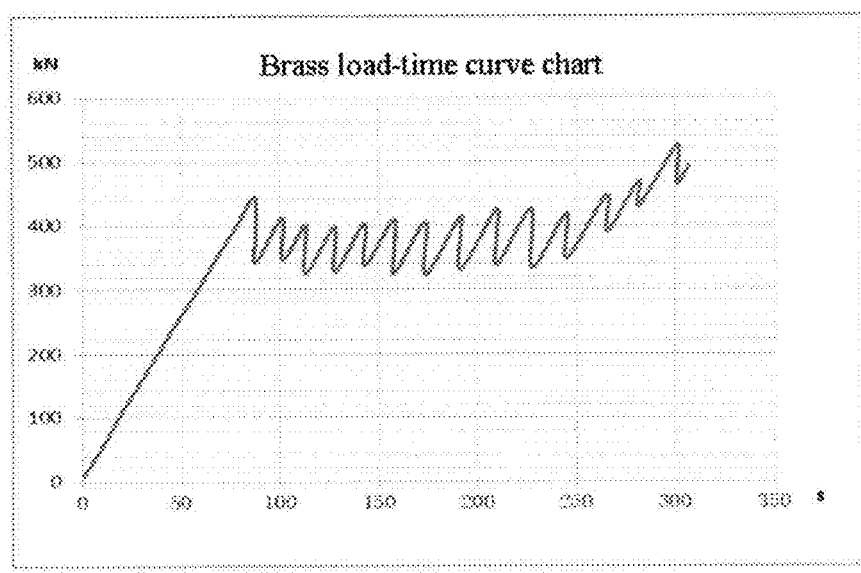
Figures 4, 6:
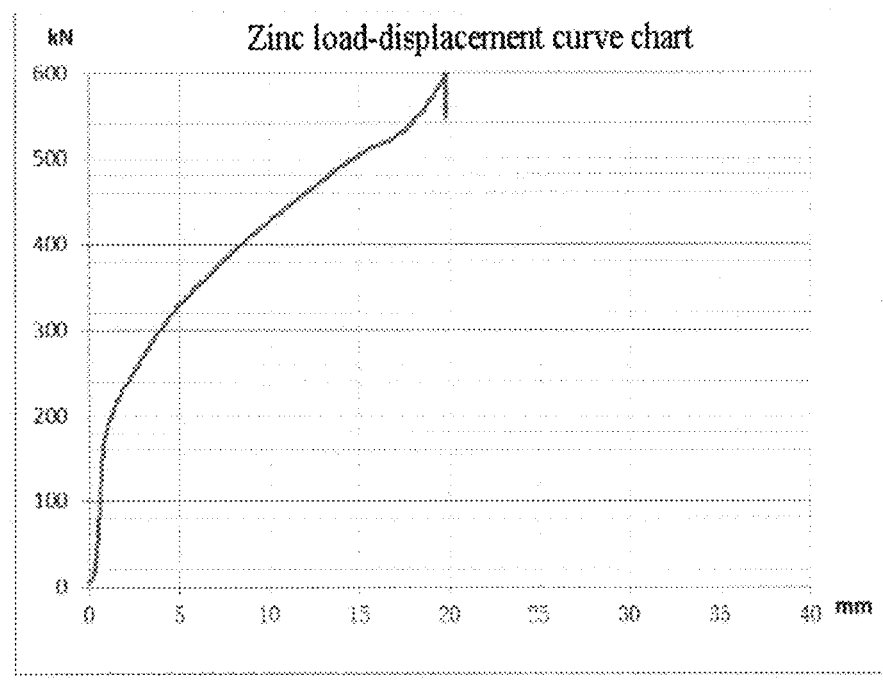
Figures 1, 7:
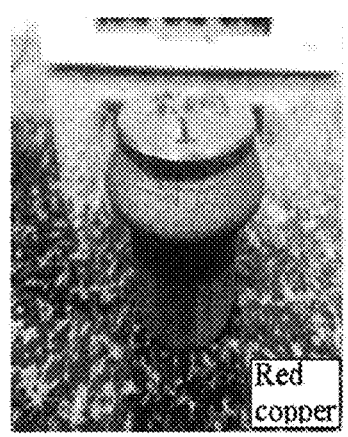
Figures 2, 7:
Figures 3, 7:
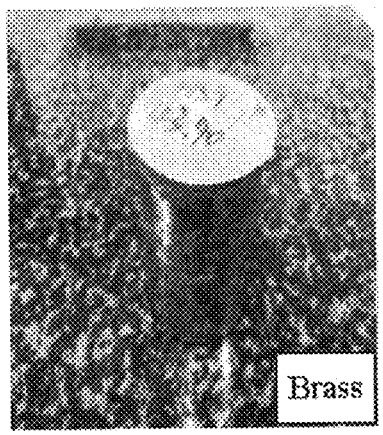
Figures 4, 7:
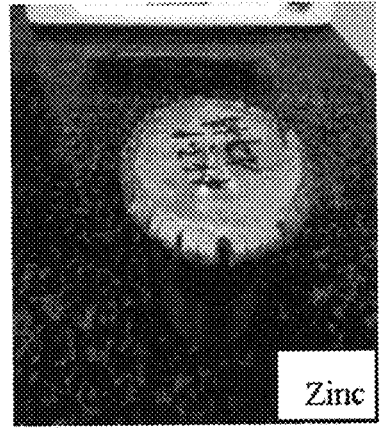

At the end of this test, load curve charts (as shown in FIGS. 6-1 to 6-4) corresponding to the metal pressure bearing columns made of different materials respectively correspond to: a red copper load-displacement curve chart, a tin bronze load-time curve chart, a brass load-time curve chart and a zinc load-displacement curve chart;

After the tests on the metal pressure bearing columns made of different materials are completed, shapes of the metal pressure bearing columns withdrew from the base plate are as shown in FIGS. 7-1 to 7-4:

it can be seen from FIGS. 7-1 to 7-4 that a brass column body and a tin bronze column body both have breaking phenomena, and their pressure bearing circular rings fall off on them in a spallation manner instead of forming effective planes after being pressed, which indicate that the brass and the tin bronze are more likely to show a brittleness characteristic, and the processes of their continuous shear spallation and repeated formation of new pressure bearing surfaces have a close relation with fluctuation of stress in the curve charts.

But the red copper is more likely to show a ductility characteristic. In a stress process, sheared red copper continuously extends and is accumulated on the pressure bearing circular ring of a red copper test piece, so that the pressure bearing surface is continuously enlarged, and the load curve continuously rises up. When the load reaches the maximum set value of 600 kN, the section of the pressure bearing circular ring is still not cracked.

The zinc shows proper ductility in the test process. The sheared zinc is not accumulated and extends like the red copper, but is cracked and curled, and its bearing capacity is expected to be stabilized at a certain level. In order to further verify whether the brass, the tin bronze and the red copper are applicable, tests are further made to multiple groups of copper and copper alloy materials in the first batch of tests, including slotting the metal pressure bearing column (slotting depth and quantity of slots), narrowing a friction contact surface between the base plate and the metal pressure bearing column and the like. All test results show that the mechanical properties and the deformation processes of the red copper, bronze and brass materials always may not meet the design requirements. In consideration of the homogenization and the stability of a material, the pure zinc material is finally selected as a bearing structural member 1 for further test.

Specifically, by means of a plurality of tests, parameters of a zinc rod serving as the bearing structural member 1 are as follows:

the sizing section 11 has the length L3 of 22 to 28 mm, and the diameter d3 of 45 to 50 mm;

the reducing section 12 has the length L2 of 18 to 22 mm, and the maximum diameter d2 of 48 to 55 mm;

the assembling section 13 has the length L1 of 13 to 16 mm, and the diameter d1 of 42 to 45 mm;

the shoulder width a is 3 to 4 mm, and the curve radius R of the side surface of the reducing section 12 is 160 to 165 mm.

Figure 8:
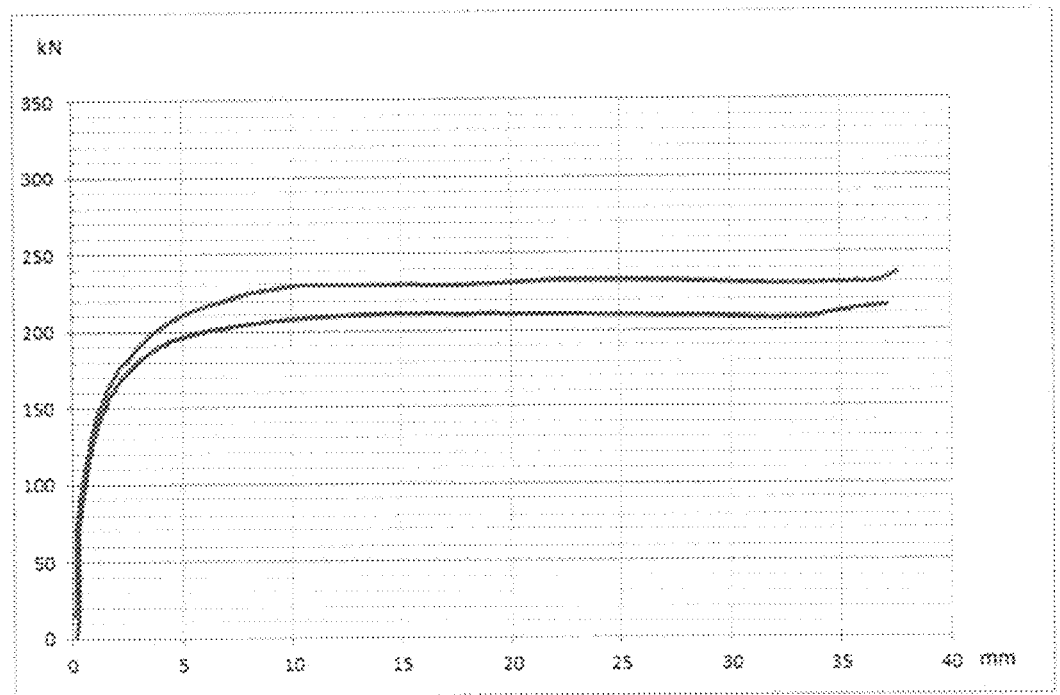
FIG. 8 is a load-displacement curve chart obtained by the test of changing the size of the zinc rod in Embodiment 3 of the present application.

The load-displacement stress-strain curves of the zinc rod are as shown in FIG. 8. The two curves in this figure are load-displacement stress-strain curve charts obtained by testing loads on two zinc rods having the same parameters, wherein the load-displacement stress-strain curve charts both have relatively good elastic curve stages, plastic curve stages and stable curve stages, and meet the requirement of the bearing structural member 1.

In addition, a conclusion of FIG. 8 is that under the condition of meeting the above-mentioned parameter requirements, a test on two bearing structural members 1 with the same structure is made by selecting a certain parameter value; the same external load is applied, so that one maximum counter force is 210 kN, and the other one is 230 kN; and the stress-strain curve of the counter force value of any one of the bearing structural members 1 and the displacement deformation amount of the bearing structural member 1 is similar to the three stages in FIG. 2. Reasons for this phenomenon are that the structures of different bearing structural members 1 have microscopic differences and also have machining and measurement errors. The maximum counter force is actually a range having a stable field, and this range is also a designed threshold value of the bearing structural member 1.

2.4 Test Conclusion

1) The metal material applicable to the pressure bearing column shall have the hardness lower than the steel 45 #, may be sheared and broken by the steel base plate, and has good corrosion resistance in an atmospheric environment;
2) in order to obtain a bearing curve in which the load is horizontally stable, in a pressing and shearing process of the pressure bearing column, part of sheared metal needs to be peeled off continuously and in time, and the pressure bearing area may not be limitlessly enlarged, or the sheared metal may not fall off limitlessly in the spallation manner;
3) by comprehensive comparison of the hardness, the corrosion resistance, the failure forms and the bearing curve change characteristics of the red copper, the tin bronze, the brass and the zinc, it considers that the metal pressure bearing column made of the zinc rod is closest to a test target; finally, the zinc is used as a manufacturing material for the metal pressure bearing column of a shear key joint for further research, and the bearing characteristics may meet the design requirements by changing the shape of the metal pressure bearing column.

Embodiment 4

Figure 9:
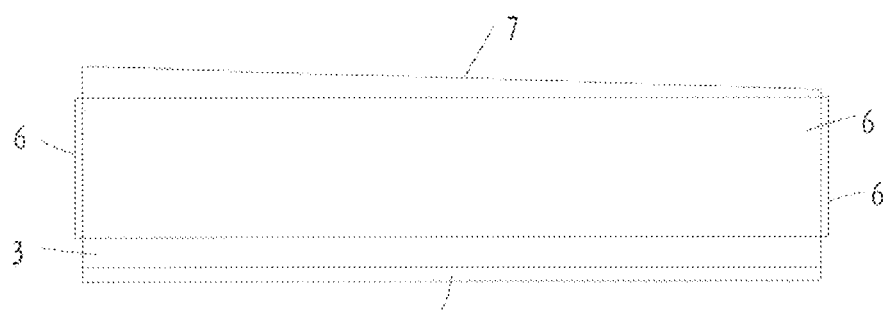
FIG. 9 is a schematic diagram of an appearance structure of a support in Embodiment 4 of the present application.
Figure 10:
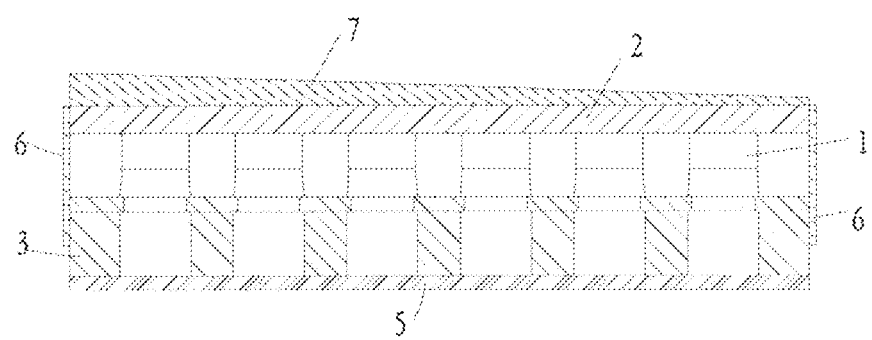
FIG. 10 is a section view in FIG. 9.

As shown in FIG. 9 and FIG. 10, Embodiment 4 provides a support 100, including at least one bearing structural member 1 mentioned in Embodiment 1. The support 100 includes the bearing structural member 1. It should be noted that when the bearing structural member 1 on the support 100 is pressed to deform, other structures inside a portion, which is located on the same layer with the bearing structural member 1, of the support 100 would not provide rigid supporting, so that the support 100 also deforms during deformation of the bearing structural member 1.

The support 100 realizes load memory protection by use of stress-strain characteristics of a counter force provided by the deformation of the bearing structural member and a displacement change amount. Namely when an external load is relatively low (less than a load upper limit of the support 100), the whole support 100 is in a rigid state, and may provide a sufficient counter supporting force by use of the elastic deformations of all the bearing structural members; when the external load is continuously increased and less than a sum of the designed threshold values of all the bearing structural members, the support 100 turns into a plastic state, and may provide a higher counter supporting force, then generate a plastic deformation and release the load; when the external load is increased to an upper limit possibly endangering the structural safety (namely the external load is greater than the sum of the designed threshold values of all the bearing structural members, but less than the load upper limit value where the support 100 is broken), the support 100 turns into a large deformation or quick cutting deformation memory state, namely the support 100 quickly releases part of the load in the quick deformation process, and provide a stable counter supporting force less than the external load all the time; and when the load is released to be less than a lower limit load (namely the minimum external load value where the support 100 generates the plastic deformation), the support 100 then turns into an elastic state.

Therefore, the support 100 overcomes the shortcomings of a rigid support 100 and a flexible support 100. When an external load is not high, the support effectively suppresses the deformation; when the external load exceeds the limit, the support quickly deforms to protect the structures; and therefore, a stable pressure may be provided to a supporting carrier at the bottom of the support 100 to protect the supporting carrier from being damaged. The support 100 may be widely applied to the engineering application fields of safety design of bridge and tunnel structures and design of building structures.

Further, a direction of the counter force provided by each bearing structural member 1 under stress is parallel to a direction of the deformation of the support 100 under the external load. The heights of all the bearing structural members 1 selected are equal, and the structures of all the bearing structural members 1 are the same, namely shapes, sizes and materials are the same. Therefore, the maximum counter supporting forces provided by the bearing structural members 1 are equal, and different quantities of bearing structural members 1 may be flexibly selected according to an actually required counter supporting force to meet desired requirements.

In addition, supports 100 with the load bearing capacities at different levels may be designed by changing diameter and length parameters of a single bearing structural member 1, and a support 100 with high load bearing capacity also may be designed by combining multiple bearing structural members 1; and meanwhile, the support 100 formed by combining the multiple bearing structural members 1 is more stable in bearing capacity, so that the instability of the support 100 only including the single bearing structural member 1 is eliminated.

Figure 12:
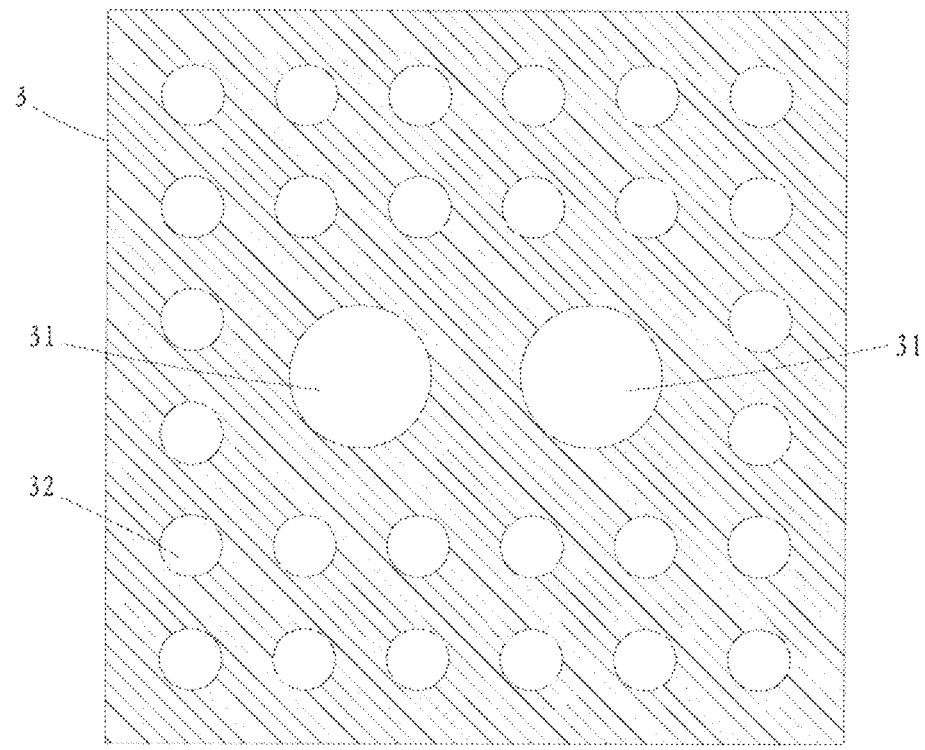
FIG. 12 is a top view of a pressure bearing plate in FIG. 9.
Figure 13:
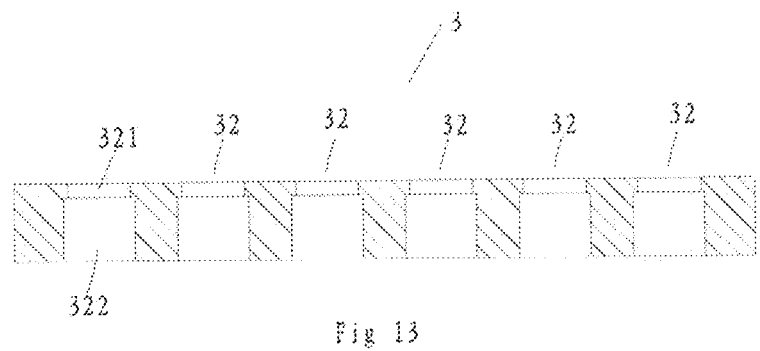
FIG. 13 is a section view of the pressure bearing plate in FIG. 12.

As shown in FIG. 12 and FIG. 13, the support 100 also includes a pressure bearing plate 3. The bottoms of all the bearing structural members 1 are disposed on the surface of the pressure bearing plate 3, and the pressure bearing plate 3 is harder than the bearing structural members 1. The pressure bearing plate 3 is disposed at the bottoms of all the bearing structural members 1, and the bearing structural members 1 are installed on the pressure bearing plate 3, so that all the bearing structural members 1 may transmit a force thereon to the pressure bearing plate, and the pressure bearing plate transmits the force to the supporting carrier below to realize stable transmission of the force of the support 100 and avoid an instable state of the support 100 due to non-uniform stress on the supporting carrier below. All the bearing structural members 1 are uniformly disposed on the pressure bearing plate 3.

A limiting structure for transversely limiting each bearing structural member 1 is disposed on the pressure bearing plate 3 to avoid transverse movement of the bearing structural member 1 under the stress and realize stably downwards transmission along the axial line. The limiting structure is an assembling hole 32 matched with the structure of an assembling section 13 on each bearing structural member 1.

The assembling hole 32 includes an upper hole 321 with a relatively small diameter and a lower hole 322 with a relatively large diameter, wherein the upper hole 321 and the lower hole 322 are communicated with each other; and the diameter of the upper hole 321 is matched with the diameter of the assembling section 13 of the bearing structural member 1. The assembling hole 32 adopts the relatively small upper hole 321, and the relatively large lower hole 322 below the upper hole. The upper hole 321 is matched with the assembling section 13 of the bearing structural member 1 to realize limit and fixing functions, and the side wall of the upper hole 321 is matched with a structure of a shoulder which connects the assembling section 13 and a reducing section 12 to realize a supporting function; and the function of the lower hole 322 is that when the bearing structural member 1 generates the large deformation or cutting deformation under the external load greater than the designed threshold value, the deformed structure may enter the lower hole 322 through the upper hole 321 to achieve a containing effect, thus avoiding the extension of the deformed structure towards the radial direction of the reducing section 12 to affect other structures of the support 100.

Further, the diameter of the upper hole 321 is 10 to 20 microns less than that of the assembling section 13 of the bearing structural member 1, so that the bearing structural member 1 may be closely fitted to the pressure bearing plate 3; and under the action of the external load, the bearing structural member 1 may not shake, but maintain a stable stress state. For each assembling hole 32 of the pressure bearing plate 3, the orifice hardness may be strengthened as required, or the orifice portion may be designed into a replaceable independent component.

Figure 11:
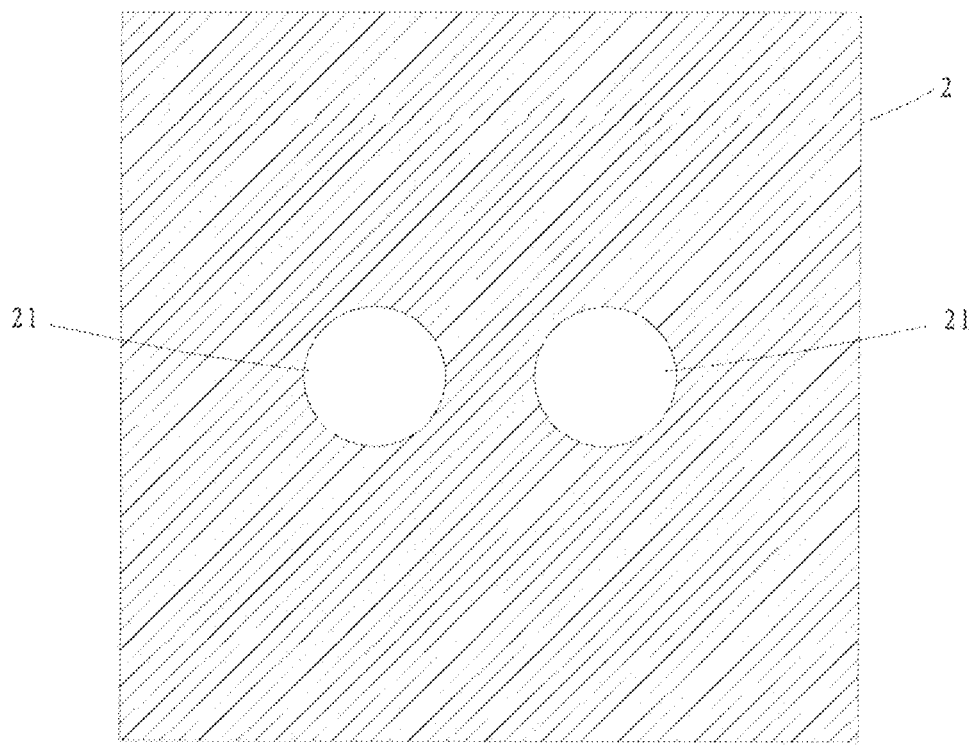
FIG. 11 is an upward view of a loading plate in FIG. 9.
Figure 14:
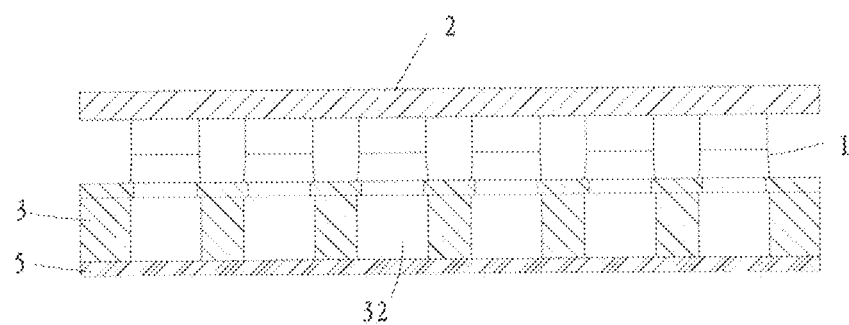
FIG. 14 is a matching schematic diagram of the loading plate, the bearing structural members, the pressure bearing plate and the base plate in FIG. 9.

In addition, the support further includes a loading plate 2. As shown in FIG. 11 and FIG. 14, the loading plate 2 is disposed at the top ends of all the bearing structural members 1; all the bearing structural members 1 are disposed between the loading plate 2 and the pressure bearing plate 3; and the loading plate 2 is harder than the bearing structural members 1. Further, the loading plate 2 is disposed at the top ends of the bearing structural members 1, and has a purpose of uniformly transmitting the force of the external load to each bearing structural member 1. It should be noted that the loading plate 2 and the perforated pressure bearing plate 3 are metal or non-metal materials harder than the bearing structural members 1, and may press and cut the bearing structural members 1 to deform them.

Figure 15:
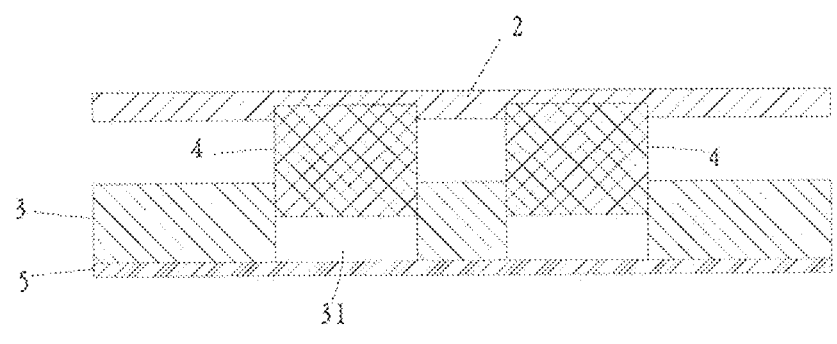
FIG. 15 is a matching schematic diagram of the loading plate, the shear-resistant columns, the pressure bearing plate and the base plate in FIG. 9.

As shown in FIG. 15, at least one shear-resistant column 4 for preventing transverse movement of all the bearing structural members 1 and the pressure bearing plate 3 are further disposed between the pressure bearing plate 3 and the loading plate 2; limiting holes 31 are formed in the pressure bearing plate 3, and blind holes 21 are formed in the loading plate 2; the lower ends of the shear-resistant columns 4 are matched with the limiting holes 31 of the pressure bearing plate 3, and the upper ends of the shear-resistant columns 4 are matched with the blind holes 21 of the loading plate 2; in an initial state, the shear-resistant columns 4 are in no contact with the bottoms of the blind holes 21, thus forming clearances; and the shear-resistant columns 4 is harder than the bearing structural members 1.

The limiting holes 31 formed in the pressure bearing plate 3 and the blind holes 21 formed in the loading plate 2 are opposite, and may contain the shear-resistant columns 4; the shear-resistant columns 4 are used to prevent a shear force in a horizontal direction on the support 100 from damaging the structures of the support 100 and avoid horizontally transverse movement of the bearing structural members 1 relative to other structures of the support 100, thereby protecting normal bearing and deformation of the bearing structural members 1 in the support 100; and of course, in order to facilitate assembling of each bearing structural member 1, a plurality of blind holes 21 corresponding to the bearing structural members 1 may be also formed in the loading plate 2. All the shear-resistant columns 4 are the same in shapes, structures and sizes, and are uniformly disposed among all the bearing structural members 1 to improve the effect of the support 100 of resisting the shear force in the horizontal direction.

An antiskid base plate 5 is further disposed at the bottom of the pressure bearing plate 3. A wedge-shaped jointing pad plate capable of adjusting the height of the support 100 is disposed above the loading plate 2, wherein the antiskid base plate 5 is used to increase horizontal slippage of the support 100 to weaken or eliminate an excessive horizontal shear force on the structures inside the support 100 due to a friction force of the supporting carrier on the bottom of the support 100, and may enable the overall support 100 to slide or rotate to a proper extent under the horizontal shear force to protect a relatively static state of the bearing structural members and other structures in the support 100. The necessity for use of the antiskid base plate 5 depends on application conditions. Specifically, the antiskid base plate 5 may be made of a material such as asphalt, rubber and stainless steel. The friction coefficient of the antiskid base plate 5 or the rotary pad plate should not be more than 0.25. The jointing pad plate 7 is used to fill up a residual clearance formed by installation of the support 100, and may be a steel pad plate 7 or a concrete bag, which is an optional structural member.

In addition, side baffles 6 are arranged at the peripheries between the loading plate 2 and the pressure bearing plate 3, are vertically installed between the loading plate 2 and the pressure bearing plate 3, and are used to beautify the appearance of the support 100 and play a role in waterproofing and dustproofing. In order to facilitate hoisting, installation and movement of the support 100, assemblies such as an anchorage plate may be further disposed on the surface of the support 100.

The support 100 in this embodiment may be in a square, polyhedral column, circular or elliptical shape, and may be further customized according to the shape and size of a placing space.

Embodiment 5

Figure 16:
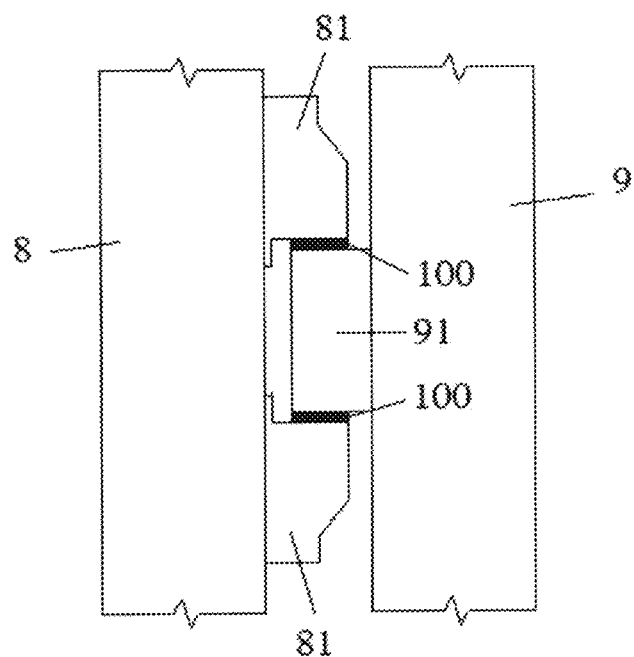
FIG. 16 is a schematic diagram of a structure of a joint assembly in Embodiment 5 of the present application.

As shown in FIG. 16, this embodiment provides a joint assembly, including a joint I 8 and a joint II 9. At least one shear key I 81 and at least one shear key II 91 are disposed at two mutually connected end portions of the joint I 8 and the joint II 9 respectively; all the shear keys I 81 and all the shear keys II 91 are disposed on the end surfaces of the corresponding joint I 8 or joint II 9 in a staggering manner; and the above-mentioned support 100 is disposed in a clearance between adjacent shear key I 81 and shear key II 91.

When two end portions of the joint I 8 and the joint II 9 are matched with each other, all the shear keys I 81 and the shear keys II 91 are matched in a staggering manner along a vertical direction. Preferably, two parallel shear keys I 81 along a horizontal direction are disposed at one end portion of the joint I 8 along the vertical direction; one shear key II 91 is disposed at the end, which is connected with the joint I 8, of the joint II 9; the shear key II 91 may be in clearance fit with the two shear keys I 81; and the support 100 is disposed in the clearance between the adjacent shear key I 81 and shear key II 91.

The joint I 8 and the joint II 9 are both reinforced concrete structural tube fittings; the shear keys I 81 are steel shear keys fixed at the end portion of the joint I 8 through embedded parts; and the shear key II 91 is a steel shear key fixed at the end portion of the joint II 9 through an embedded part. As the two steel shear keys are both embedded into the two joints and have ultimate loads, the support 100 having the designed threshold value equal to the ultimate loads of the steel shear keys are used to play a role in protecting the two joints.

The joint assembly in this embodiment includes the joint I 8 and the joint II 9. The joint I 8 and the joint II 9 may be two independent structural members, such as structures disposed at the end portions of structural members such as a beam body and a tube body. Different from conventional fixed connection or rigid connection, the joint assembly adopts two shear keys. The support 100 is disposed between the shear key I 81 and the shear key II 91, and ultimate loads of the shear key I 81 and the shear key II 91 are deemed to be equal to the designed threshold value of the support 100. As the support 100 includes the bearing structural members 1 which may provide the maximum counter force equal to the designed threshold value under an external load, the joint assembly may provide a transmission effect of a certain designed load value, namely the support 100 in the joint assembly may provide a certain supporting force to the beam body or tube body structural member connected with the joint I 8 or/and the joint II 9; and when the external load is less than or equal to the designed threshold value of the support 100, the support 100 provides a counter supporting force just like a rigid structural member to keep the joint assembly in a stable state.

When the external load is greater than the designed threshold value of the support 100, the support 100 quickly deforms or generates a cutting deformation to keep a pressure transmitted by the support 100 to the shear keys below equal to the designed threshold value till the joint I 8 and the joint II 9 reach a new equilibrium; when the support 100 deforms to the maximum (namely the bearing structural members 1 completely deforms and are flattened), but the external load still exceeds the designed threshold value of the support 100, the external load on the support 100 is transmitted to the two shear keys; however, the external load also exceeds the ultimate loads of the shear keys, so that the shear keys are broken, including cases that one joint is kept stable, and the joint I 8 is separated from the joint II 9 to avoid simultaneous breakage of the two joints; compared with the case that the existing two fixedly and rigidly connected joints may deform or be broken at the same time under the external load, the joint assembly overcomes the shortcomings of rigid connection or flexible connection of the existing joints by disposal of the support 100 having the bearing structural members 1; when an external load is not high, the joint assembly may effectively suppress the deformation; when the external load exceeds the limit, the support 100 in the joint assembly quickly deforms to protect the structures; and therefore, a stable counter supporting force may be provided to the two joints to protect the two joints from being damaged at the same time. The joint assembly may be widely applied to the engineering application fields of safety design of bridge and tunnel structures and design of building structures.

Embodiment 6

Figure 17:
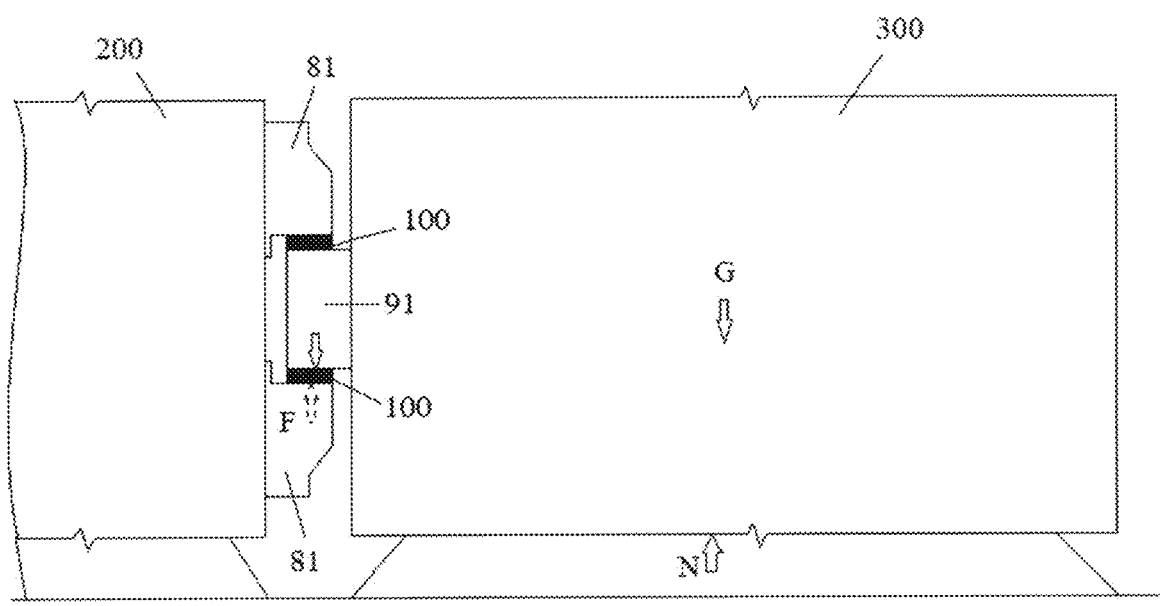
FIG. 17 is a schematic diagram of an initial mechanical equilibrium of a tube section assembly in Embodiment 6 of the present application before an external load f is applied.

As shown in FIG. 17, this embodiment provides a tube section assembly, including a plurality of tube sections. Two adjacent tube sections are connected through the above-mentioned joint assembly.

Figure 18:
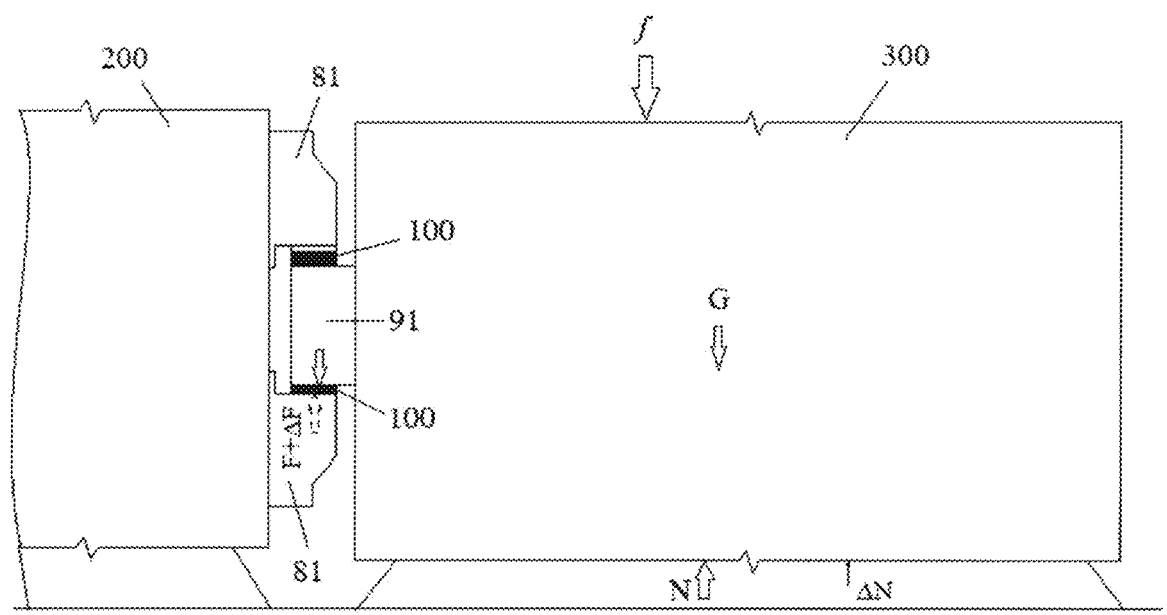
FIG. 18 is a schematic diagram of a new mechanical equilibrium of a tube section assembly in Embodiment 7 of the present application after an external load f is applied.

The tube sections included in the tube section assembly may be applied to connection of tube bodies on lands and mountains, and even may be applied to the field of seabed immersed tubes, for example, during application to the seabed immersed tubes, when the tube section II 300 may possibly settle by sunken ship collision, seaquake and the like under the condition that the external load force on the tube section II 300 turns into f, one end of the tube section II 300 firstly transmits the force into the joint assembly connected with the tube section I 200, then an external load on the support 100 of the joint assembly is suddenly increased, and the bearing structural members 1 in the support 100 then deform to provide a counter supporting force F to enable the two tube sections to reach a new mechanical equilibrium, as shown in FIG. 18; that is, when the tube sections move mutually, pressing stress is generated between the shear keys of the tube section assembly; when the stress is relatively low, the bearing structural members 1 transmit the shear force via the elastic deformation, so that the respective shear keys may not be damaged; when the stress is relatively high, and may possibly damage the shear keys and the embedded parts, the bearing structural members 1 generate the plastic deformation and are pressed into the lower holes 322 of the pressure bearing plate 3; metals of the bearing structural members 1 which are larger than the apertures of the upper holes 321 of the pressure bearing plate 3 are sheared and striped, the shear key pressure bearing joint assembly is compressed, and then is released to deform, and the load on the shear key I 81 or the shear key II 91 is reduced, so that the shear key I 81 and the shear key II 91 are protected from being damaged, specifically including the following cases:

(1) As stated, the tube section assembly is in an original mechanical equilibrium before the external load f is applied, and the initial mechanical equilibrium may be expressed as:

$$G=F+N;$$

where G is the gravity of the tube section II 300, F is an initial counter supporting force provided by the tube section I 200 to the tube section II 300 through the support 100 of the joint assembly, and N is a supporting force of a foundation to the tube section II 300.

(2) When the external load f acts on the tube section II 300, and is less than or equal to the designed threshold value of the support 100, as the tube section II 300 is pressed by the external load f, the support 100 of the joint assembly between the tube section I 200 and the tube section II 300 is pressed by a higher pressure and then generates the elastic deformation or plastic deformation, and a counter supporting force provided by the support 100 is increased by ΔF and reaches F+ΔF; the counter supporting force F+ΔF provided by the joint assembly is released to the tube section I 200 and the tube section II 300 for sharing, so that the end portion of the tube section II 300 connected with the joint assembly may not move relative to the tube section I 200, and the positions of the two tube sections are kept unchanged; even if there is a displacement, it is a displacement change caused by common settlement of the tube section I 200 and the tube section II 300; the settlement amount of the tube section II 300 may be ignored till a counter acting force provided by the bottoms of the two tube sections is equal to a pressure of the tube section I 200 and the tube section II 300, and at the moment, a new mechanical equilibrium state may be expressed as:

$$G+f=(F+\Delta F)+N;$$

where G is the gravity of the tube section II 300, f is the external load on the tube section II 300, F+ΔF is a new supporting force provided by the tube section I 200 to the tube section II 300 through the support 100 of the joint assembly, and N is the supporting force of the foundation to the tube section II 300.

(3) When the external load f acts on the tube section II 300, and is greater than the designed threshold value of the support 100, the support 100 of the joint assembly may quickly deform and generate a cutting deformation; the counter supporting force provided by the support 100 is quickly increased till F+ΔF=Fmax is equal to the designed threshold value of the support 100; however, in the deformation process of the support 100, the end portion of the tube section II 300 may move relative to the tube section I 200, leading to relative displacement between a structural member II and a structural member I, but the acting force, which is transmitted to the tube section I 200, of the external load on the tube section II 300 is always equal to the designed threshold value counter force provided by the deformation of the support 100, so that it falls within a safe range, and may not affect the stability of the tube section I 200 and the structures of the joint assembly; at the moment, as the tube section II 300 moves, settlement is caused; on account of the settlement of the tube section II 300, a supporting foundation at the bottom of the tube section II 300 is pressed to provide a counter supporting force N to the tube section II 300, namely the counter supporting force of the foundation to the tube section II 300 is gradually increased; when the increment ΔN of the counter supporting force of the foundation to the tube section II 300 offsets part of the load force, which is caused by the settlement of the tube section II 300, on the support 100 of the joint assembly, and when the load force on the joint assembly between the tube section I 200 and the tube section II 300 is less than or equal to the designed threshold value of the support 100, the support 100 stops deforming and keeps a new mechanical equilibrium state, or the support 100 would deform all the time, the tube section II 300 would settle all the time, and the foundation would also be compressed all the time; the counter supporting force provided by the foundation is continuously increased till supporting forces of the tube section I 200, the joint assembly and the foundation to the tube section II 300 reach the new mechanical equilibrium state, so that all the structures can be kept in a stable equilibrium state, and at the moment, the mutual displacement of the tube section I 200 and the tube section II 300 may be very small relative to the size of each tube section (if the size of the tube section is more than 10 meters, the displacement amount is several centimeters); and the new mechanical equilibrium is achieved by an extremely small deformation amount of the support 100. The new mechanical equilibrium state may be expressed as:

$$G+f=F\max+(N+\Delta N);$$

where G is the gravity of the tube section II 300, f is the external load on the tube section II 300, Fmax is the maximum counter supporting force provided by the tube section I 200 to the tube section II 300 through the support 100 of the joint assembly, N is the initial supporting force of the foundation to the tube section II 300, and ΔN is an increased supporting force of the foundation to the tube section II 300 due to the compression;

in combination with the formulas in (1), (2) and (3), a formula may be further obtained:

$$f=\Delta F+\Delta N;$$

this formula means that when the external load f acting on the tube section II 300 is greater than the designed threshold value of the support 100, the counter supporting force provided by the tube section I 200 to the tube section II 300 on account of the deformation of the support 100 of the joint assembly is quickly increased and reaches the designed threshold value Fmax; at the moment, the tube section II 300 settles on account of the quick deformation or cutting deformation of the support 100, and the settlement of the tube section II 300 may press the foundation, so that the counter supporting force of the foundation to the tube section II 300 also may be quickly increased;

when the sum of the increment ΔN of the counter supporting force of the foundation and the fixed counter supporting force ΔF increased by the support 100 are equal to the external load f, the tube section assembly reaches the new mechanical equilibrium, and is kept in the stable state;

it should be understood that under an actual working condition, after the external load f on the tube section II 300 breaks the original mechanical equilibrium of the tube section assembly, the mechanical equilibrium of the tube section I 200 connected with the tube section II 300 is affected, and the tube section assembly needs take certain time to reach the new mechanical equilibrium, but this time is not within few hundreds of seconds or dozens of minutes spent in completing the test in Embodiment 3. This time is a long process, and even dozens of years, but it does not affect the deformation of the bearing structural members 1 in the support 100 between the tube section assemblies, namely does not affect the form change of a load-displacement deformation characteristic curve of the bearing structural members 1 in the support 100. In the long-time deformation process, the external load on the bearing structural members 1 changes more slowly over time, so that the load counter force provided by the bearing structural members 1 and the displacement deformation also change more slowly over time, but the forms of their characteristic curves are consistent with the curves in FIG. 8 in Embodiment 3.

(4) When the external load f acts on the tube section II 300, under an extreme condition, the external load f is much greater than the designed threshold value Fmax of the support 100; after the load acting force provided to the joint assembly is increased so as to enable the support 100 to quickly deform and generate the cutting deformation to the maximum, and when the increment ΔN of the counter supporting force, which is caused by the settlement of the tube section II 300, of the foundation is not enough to offset part of the load force, which is greater than the threshold value, on the support 100 of the joint assembly, namely:

$$\Delta F+\Delta N<f,$$

the load force on the shear keys I 81 on the tube section I 200 of the joint assembly also exceeds the ultimate load, and then the shear keys I 81 are broken, which leads to separation of the tube section I 200 and the tube section II 300 and continuous settlement of the tube section II 300; and the external load force is only borne by the tube section II 300 instead of being jointly borne by the tube section I 200 and the tube section II 300, which leads to continuous settlement of the tube section II 300, so that the tube section II 300 is separated from the tube section I 200, and the tube section II 300 and the foundation are compressed mutually to reach the new mechanical equilibrium:

$$G+f=N+\Delta N;$$

but compared with the case that the tube section I 200 and the tube section II 300 may be possibly damaged at the same time on account of their rigid connection, this extreme condition may prevent the tube section I 200 and even more other tube sections from being damaged, thereby maintaining the safety of most tube section structures.

The tube section assembly may be widely applied to the engineering application fields of safety design of land bridge and tunnel structures, design of building structures and connection of seabed pipelines, thereby increasing the design safety coefficient of tube sections, reducing the potential risk, and facilitating the maintenance of the tube section.

All features disclosed herein, or steps in all methods or processes disclosed herein may be combined in any ways other than those features and/or steps that are mutually exclusive. Unless specifically stated, any features disclosed in the description (including any attached claims, abstracts and drawings) may be replaced by other equivalent substitutive features or substitutive features having similar purposes. That is, unless specifically stated, each feature is only an example in a series of equivalent or similar features.

The invention claimed is:

1. A method of designing a bearing structural member, comprising providing the bearing structural member with a maximum counter force that is an own designed threshold value under an external load, such that when the external load is greater than the designed threshold value of the bearing structural member, the bearing structural member deforms and provides a counter force equal to the designed threshold value.

2. The method according to claim 1, wherein when the external load is less than or equal to the designed threshold value of the bearing structural member, the counter force is not greater than the external load.

3. The method according to claim 1, wherein when the external load is less than or equal to the designed threshold value of the bearing structural member, the bearing structural member generates an elastic deformation or a plastic deformation.

4. The method according to claim 1, wherein the external load is a pressure on the bearing structural member.

5. A bearing structural member, provides a maximum counter force that is an own designed threshold value under an external load, and but when the external load is greater than the designed threshold value of the bearing structural member, the bearing structural member deforms and provides a counter force equal to the designed threshold value.

6. The bearing structural member according to claim 5, wherein when the external load is less than or equal to the designed threshold value of the bearing structural member, the bearing structural member generates an elastic deformation or a plastic deformation, and the counter force is not greater than the external load.

7. The bearing structural member according to claim 5, wherein the bearing structural member comprises a metal or a metal alloy.

8. The bearing structural member according to claim 7, wherein the bearing structural member comprises a zinc structural member or a zinc alloy structural member.

9. The bearing structural member according to claim 7, wherein the bearing structural member comprises an aluminum structural member or an aluminum alloy structural member.

10. The bearing structural member according to claim 5, wherein the bearing structural member comprises a columnar body or a rotator structure.

11. The bearing structural member according to claim 10, wherein the bearing structural member comprises a reducing section having a cross section with a size that changes along an axial direction.

12. The bearing structural member according to claim 11, wherein the size of the cross section gradually increases along the axial direction.

13. The bearing structural member according to claim 12, wherein the reducing section has a side surface that sinks inwards and has a horn shape.

14. The bearing structural member according to claim 11, wherein the bearing structural member further comprises a sizing section connected to the reducing section, and the sizing section comprises a second structural part having a cross section with a size that is equal along the axial direction.

15. The bearing structural member according to claim 14, wherein the reducing section has a first end with a cross-sectional size that is larger than that of a second end of the reducing section that is connected with the sizing section.

16. The bearing structural member according to claim 14, wherein the sizing section and the reducing section are in smooth transition, and the bearing structural member is an integrated structural member.

17. The bearing structural member according to claim 14, further comprising an assembling section for installing the bearing structural member at a lower end of the reducing section, and a structural size of an end of the assembling section that is connected with the reducing section is smaller than a size of an end portion structure of the reducing section.

18. The bearing structural member according to claim 17, wherein the assembling section comprises a rotator structure, and the assembling section, the sizing section and the reducing section are integrated structural members.

19. The bearing structural member according to claim 18, wherein the sizing section, the reducing section and the assembling section of the bearing structural member have respective cross-sectional diameters of $d_3$, $d_3$ to $d_2$, and $d_1$, wherein $d_2$ is greater than $d_3$, $d_3$ is greater than $d_1$, and the cross-sectional diameter of the reducing section is $d_3$ at minimum and $d_2$ at maximum.

20. The bearing structural member according to claim 19, comprising a shoulder that connects the reducing section with the assembling section, and the shoulder has a width of $(d_2-d_1)/2$, wherein $(d_2-d_1)/2$ ranges from 3 to 4 mm.

21. The bearing structural member according to claim 19, wherein the sizing section has a length of 22 to 28 mm, and $d_3$ is 45 to 50 mm; the reducing section has a length of 18 to 22 mm, and $d_2$ is 48 to 55 mm; and the assembling section has a length of 13 to 16 mm, and $d_1$ is 42 to 45 mm.

22. A support, comprising said bearing structural member according to claim 5.

23. The support according to claim 22, comprising a plurality of the bearing structural members, wherein each of the bearing structural members has an equal height.

24. The support according to claim 23, wherein each of the bearing structural members has an identical shape, size and material.

25. The support according to claim 23, further comprising a pressure bearing plate, wherein each of the bearing structural members has a bottom on a surface of the pressure bearing plate, and the pressure bearing plate is harder than the bearing structural members.

26. The support according to claim 25, further comprising a limiting structure for transversely limiting each bearing structural member on the pressure bearing plate.

27. The support according to claim 26, wherein the limiting structure includes an assembling hole matched with a structure of an assembling section on each bearing structural member.

28. The support according to claim 27, wherein the assembling hole comprises an upper hole with a relatively small diameter and a lower hole with a relatively large diameter; the upper hole and the lower hole communicate with each other; and the upper hole has a diameter that matches with a diameter of the assembling section on the bearing structural member.

29. The support according to claim 28, wherein the upper hole is in interference fit with the assembling section on the bearing structural member.

30. The support according to claim 29, wherein the diameter of the upper hole is 10 to 20 microns less than that of the assembling section on the bearing structural member.

31. The support according to claim 25, wherein the support further comprises a loading plate; the loading plate is at a top end of the bearing structural members; each of the bearing structural members is between the loading plate and the pressure bearing plate; and the loading plate is harder than the bearing structural members.

32. The support according to claim 31, further comprising at least one shear-resistant column for preventing transverse movement of the bearing structural members between the pressure bearing plate and the loading plate, limiting holes in the pressure bearing plate, and blind holes in the loading plate; wherein the at least one shear-resistant column has a lower end matched with the limiting holes of the pressure bearing plate and an upper end matched with the blind holes of the loading plate; in an initial state, the at least one shear-resistant column is not in contact with bottoms of the blind holes, thus forming clearances; and the at least one shear-resistant column is harder than the bearing structural members.

33. The support according to claim 32, comprising a plurality of the shear-resistant columns having a same shape, structure and size, uniformly disposed among the bearing structural members.

34. The support according to claim 32, further comprising an antiskid base plate disposed at a bottom of the pressure bearing plate.

35. The support according to claim 32, further comprising a wedge-shaped jointing pad plate above the loading plate, capable of adjusting a height of the support.

36. The support according to claim 32, further comprising side baffles at peripheries between the loading plate and the pressure bearing plate.

37. A joint assembly, comprising a joint I, a joint II; at least one shear key I and at least one shear key II at mutually connected end portions of the joint I and the joint II; and the support according to claim 23, wherein the at least one shear key I and the at least one shear key II are on end surfaces of the corresponding joint I and joint II in a staggered manner; and the support according to claim 23 is in a clearance between adjacent ones of the at least one shear key I and the at least one shear key II.

38. The joint assembly according to claim 37, wherein first and second end portions of the joint I and the joint II are matched with each other, and the at least one shear key I and the at least one shear key II are matched in a staggered manner along a vertical direction.

39. The joint assembly according to claim 38, comprising two parallel shear keys I along a horizontal direction at one end portion of the joint I along the vertical direction; and one shear key II at an end of the joint II connected with the joint I; wherein the one shear key II is in clearance fit with the two shear keys I; and the support is in the clearance between the adjacent shear key I and shear key II.

40. The joint assembly according to claim 37, wherein the joint I and the joint II each comprise reinforced concrete structural tube fittings; the at least one shear key I comprises a plurality of steel shear keys fixed at an end portion of the joint I through embedded parts; and the at least one shear key II comprises a steel shear key fixed at an end portion of the joint II through an embedded part.

* * * * *